(12) United States Patent
Hartman

(10) Patent No.: US 6,959,520 B2
(45) Date of Patent: Nov. 1, 2005

(54) DEMAND SIDE MANAGEMENT STRUCTURES

(76) Inventor: Paul H. Hartman, 11631 Cherry Hollow Dr., Chardon, OH (US) 44024

( * ) Notice: Subject to any disclaimer, the term of this patent is extended or adjusted under 35 U.S.C. 154(b) by 259 days.

(21) Appl. No.: 10/624,363

(22) Filed: Jul. 22, 2003

(65) Prior Publication Data

US 2004/0123550 A1 Jul. 1, 2004

Related U.S. Application Data

(63) Continuation-in-part of application No. 09/897,215, filed on Jul. 2, 2001, now abandoned.
(60) Provisional application No. 60/215,919, filed on Jul. 3, 2000.

(51) Int. Cl.$^7$ ................................................. E04C 3/04
(52) U.S. Cl. ..................... 52/729.2; 52/730.1; 52/737.1
(58) Field of Search ............................. 52/729.1, 729.2, 52/730.1, 731.1, 737.1, 737.2, 737.3

(56) References Cited

U.S. PATENT DOCUMENTS

| | | | | |
|---|---|---|---|---|
| 178,076 | A | * | 5/1876 | Nostrand .................... 52/729.2 |
| 542,283 | A | * | 7/1895 | Rousseau .................... 52/729.2 |
| 1,535,504 | A | * | 4/1925 | Stephens ...................... 52/234 |
| 1,939,598 | A | | 12/1933 | Ragsdale |
| 2,863,185 | A | | 12/1958 | Riedi |
| 3,110,374 | A | * | 11/1963 | Valverde ...................... 52/581 |
| 3,316,863 | A | * | 5/1967 | Zock ........................... 108/108 |
| 3,760,548 | A | | 9/1973 | Sauer |
| 3,788,013 | A | | 1/1974 | Veen |
| 3,966,342 | A | | 6/1976 | Moriya |
| 4,104,834 | A | | 8/1978 | Anghinetti |
| 4,244,355 | A | | 1/1981 | Stout |
| 4,249,830 | A | | 2/1981 | Day |
| 4,327,707 | A | | 5/1982 | Wilhelm |
| 4,485,597 | A | | 12/1984 | Worrallo |
| 4,549,832 | A | | 10/1985 | Sterl |
| 4,567,710 | A | | 2/1986 | Reed |
| 4,738,072 | A | | 4/1988 | Clemensen |
| 4,875,320 | A | | 10/1989 | Sparkes |
| 4,926,611 | A | | 5/1990 | Funaki |
| 4,989,782 | A | * | 2/1991 | McKie ..................... 238/10 R |
| 5,027,741 | A | | 7/1991 | Smith |
| 5,062,247 | A | | 11/1991 | Dittmer |
| 5,062,250 | A | * | 11/1991 | Buzzella ................... 52/586.2 |
| 5,125,207 | A | * | 6/1992 | Strobl et al. ............... 52/747.1 |
| 5,134,827 | A | | 8/1992 | Hartman |

(Continued)

Primary Examiner—Brian E. Glessner

(57) ABSTRACT

An improved building panel and attachment system for the production of structures with improved energy efficiency and fire safety characteristics. Panels are formed from a structural angle I™ beam with angles emerging from a web and forming dovetail shaped channels. The dovetail channels provide anchorage points for cross members within the panels as well as weather-stripping and mechanical joints between panels and a building frame. Fiberglass can be combined with Argon gas in the panels to significantly improve R-Values in commercial buildings. A fire safety system allows heat and smoke to be vented from the building during a fire, and for improved safety and effectiveness of fire fighting personnel. Improved insulating panels, daylighting panels with light attenuation and heat dissipation means, as well as solar panels for heating and cooling are shown. These can be assembled into a roof decks and walls to reduce building operating costs and create more attractive retail and commercial buildings. An improved air distribution system, and thin film collectors allow for production of an entire roof of solar collectors at a reasonable cost. An advanced control system for balancing daylighting and artificial lighting is shown, along with a demand side management, (DSM), energy conservation system. Distributed power systems for developing countries and un-interruptible power supplies with reduced cost for photovoltaics are also produced from the panels.

22 Claims, 12 Drawing Sheets

U.S. PATENT DOCUMENTS

| | | |
|---|---|---|
| 5,165,659 A | 11/1992 | L'Heureux |
| 5,204,777 A | 4/1993 | Curshod |
| 5,233,807 A * | 8/1993 | Spera ................. 52/729.1 |
| 5,323,576 A | 6/1994 | Gumpert |
| 5,343,665 A | 9/1994 | Palmerston |
| 5,483,956 A | 1/1996 | Shapiro |
| 5,617,682 A | 4/1997 | Christopher |
| 5,724,780 A | 3/1998 | Bolich |
| 5,737,893 A | 4/1998 | Rossiter |
| 5,875,599 A | 3/1999 | McGrath |
| 5,927,990 A | 7/1999 | Welch |
| 5,960,596 A | 10/1999 | Lyons |
| 5,965,231 A | 10/1999 | Rotermund et al. |
| 5,974,760 A | 11/1999 | Tingley |
| 6,003,609 A | 12/1999 | Walls |
| 6,114,948 A | 9/2000 | Astell |
| 6,161,348 A | 12/2000 | Morris |

\* cited by examiner

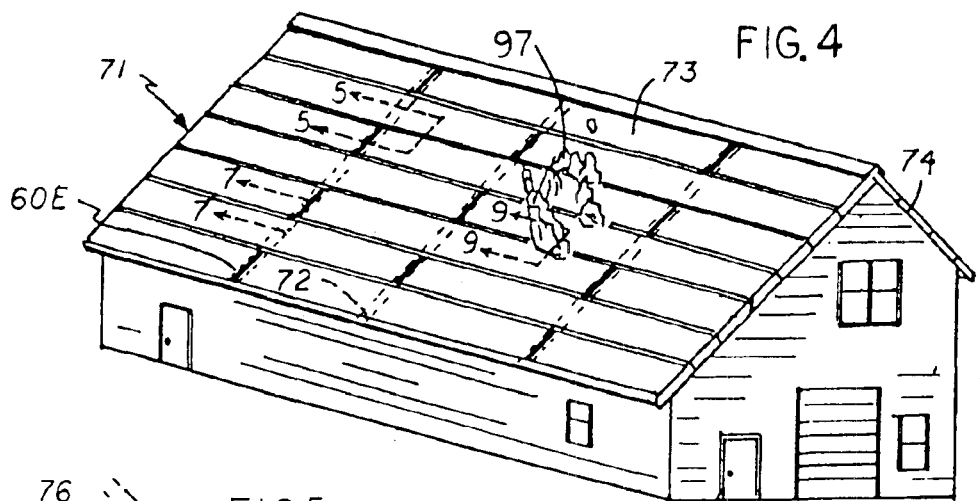
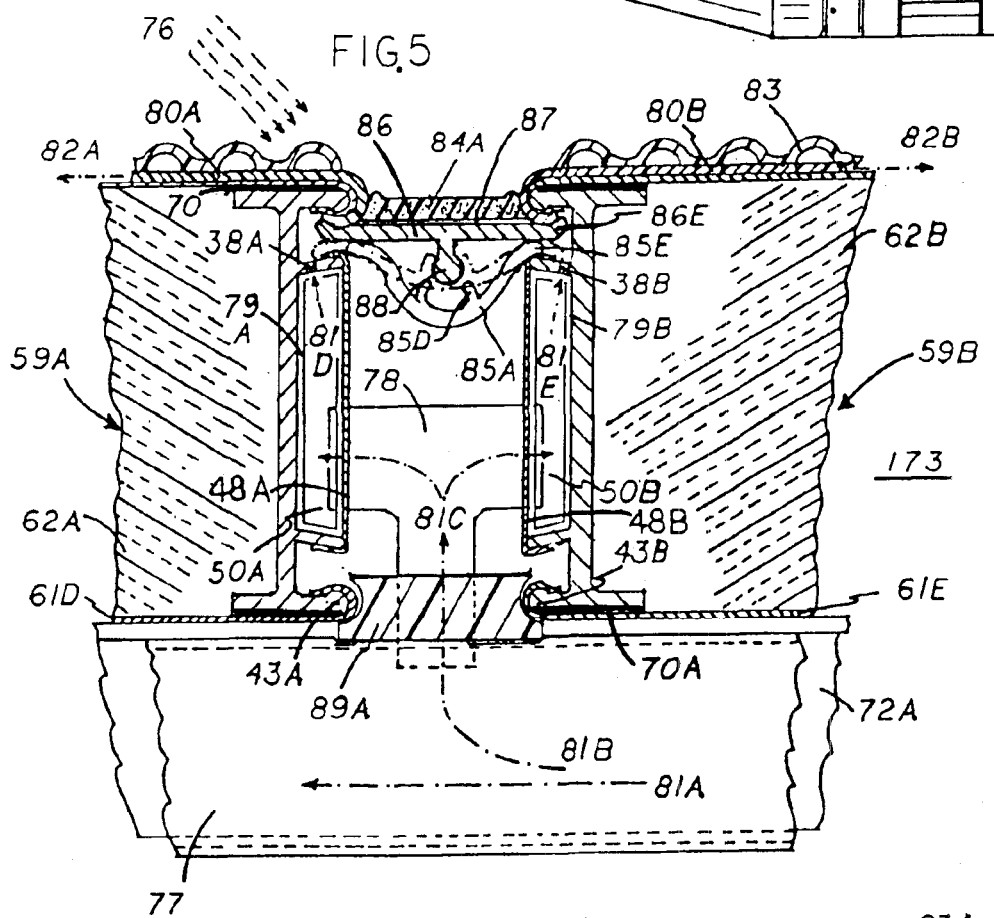
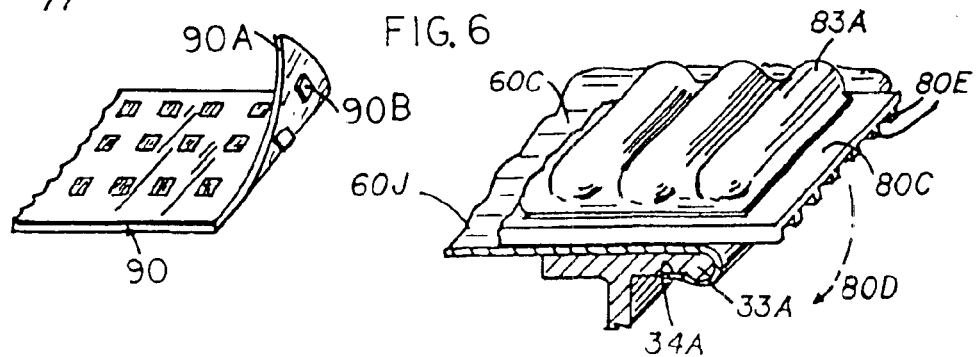

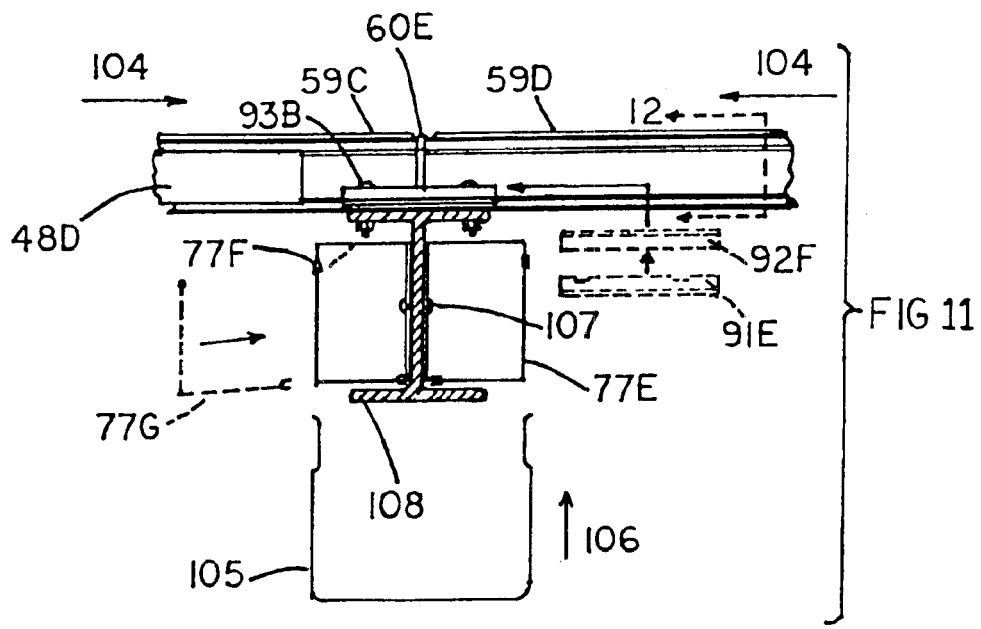
FIG. 11
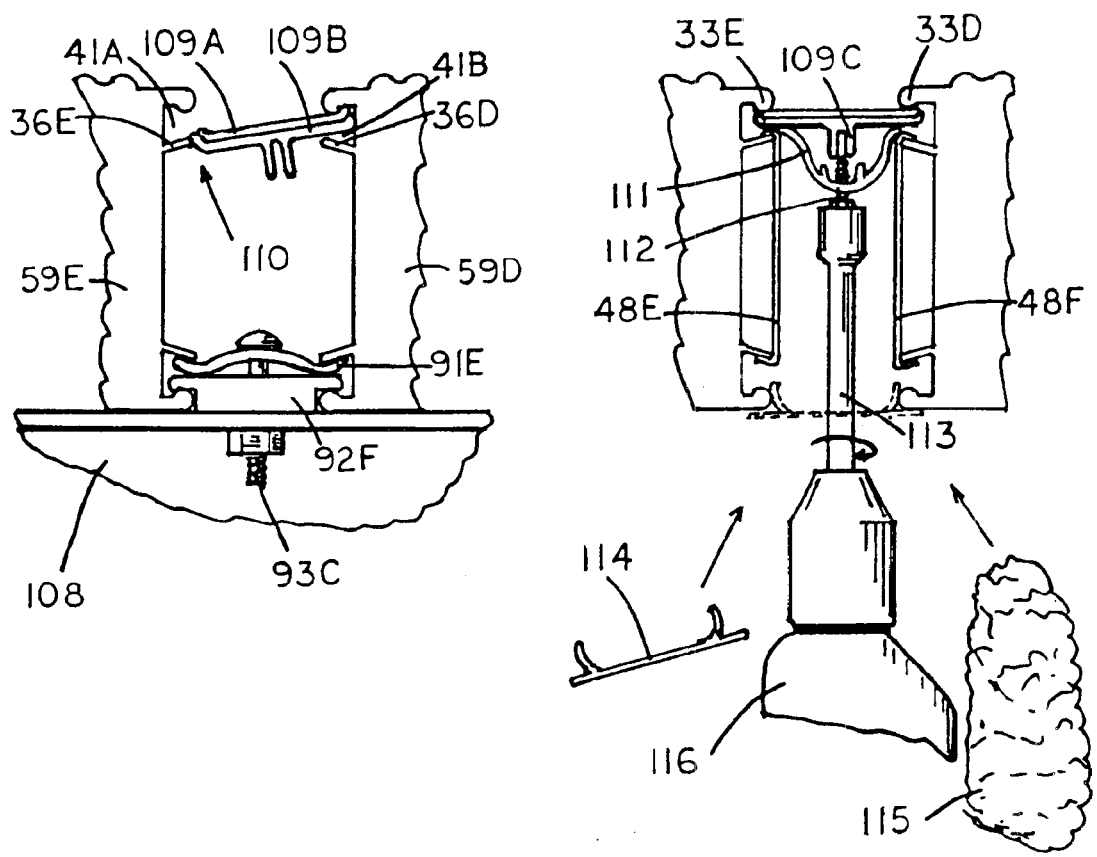
FIG. 12
FIG. 13

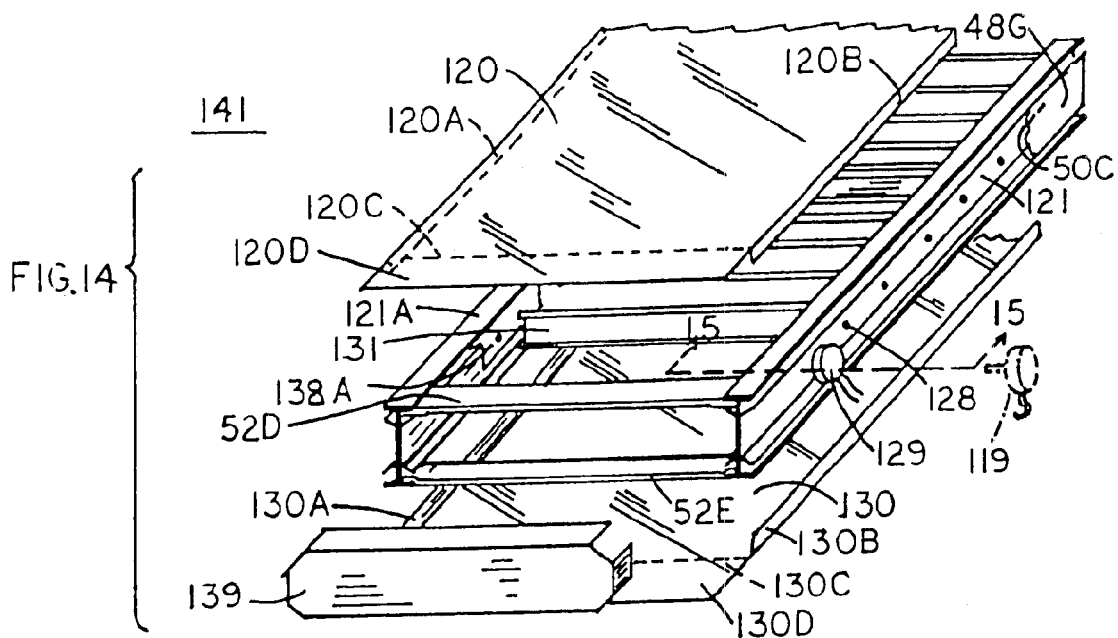
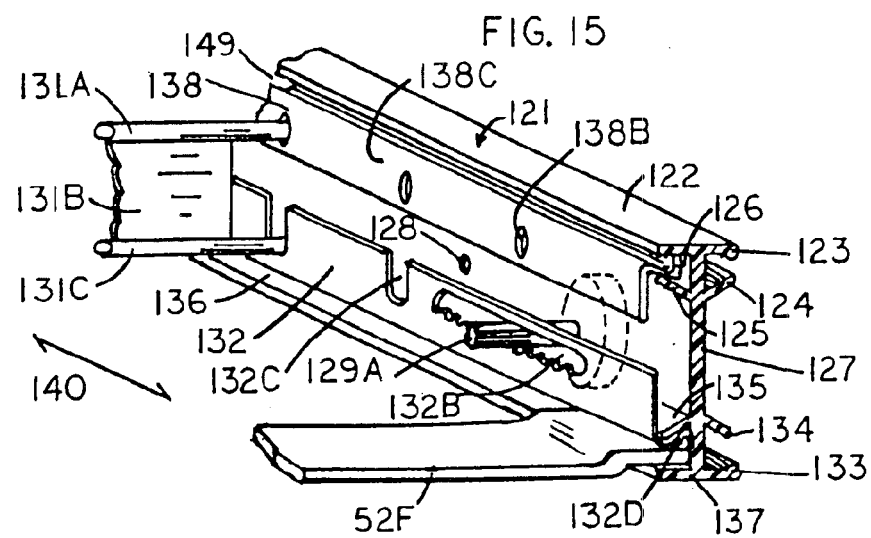

DEMAND SIDE MANAGEMENT STRUCTURES

The following application is a Continuation-in-part of U.S. patent application Ser. No. 09/897,215, which was filed on Jul. 2, 2001, now abandoned, which claimed priority to provisional application No. 60/215,919, filed on Jul. 3, 2000.

BACKGROUND

1. Field of Invention

This invention relates to structures, specifically to commercial buildings that provide demand side management energy savings, and improved fire safety.

2. Description of Prior Art

There is a great need and public support for improving the energy efficiency in the United States. Commercial buildings account for one-sixth of national energy consumption and 32% of electricity use, yet roof R values average about 10 for most small and medium size structures.

In general, insulation ratings are compromised in systems buildings by compression of insulation at metal purlins. This degrades the already low insulation value installed because of cost considerations. Other factors are the tenuous vapor barrier of insulation facing and the practice of stapling seams of facing together contribute to eventual condensation, further degradation of R—value and corrosion on the underside of the roof deck.

A number of workers, such as Clemenson (U.S. Pat. No. 4,738,072), Sparkes (U.S. Pat. No. 4,875,320), and Bolich (U.S. Pat. No. 5,724,780) have attempted to solve compression of insulation by techniques to encapsulate the metal purlins and expand the insulation to its full thickness with supporting structures. These systems add complexity and cost to an already tedious construction system with multiple passes across the roof deck during installation. They do not improve the R—value of fiberglass insulation and do not address basic problem of the metal purlins introducing a thermal short circuit.

One approach to insulation improvement is the use insulating gas mixtures as typically used in windows and some foams, example Rotermund (U.S. Pat. No. 5,965,231). To date, it has not been used extensively with conventional fiberglass insulation.

Another approach to solving insulation problems has been to utilize structural insulated panels with foam cores as typified by Sauer (U.S. Pat. No. 3,760,548). These systems are yet more expensive, and rarely used to replace the purlins; structural properties are not used effectively. They are universally attached to the structure with self-drilling screws that pass through the joints between panels. Problems arise from roof leakage. These are only partially solved with additional labor intensive steps in construction.

The tight barrier and heat reflective roofing often causes rapid flashover in a building fire. The organic foam insulation contributes large amounts of smoke. It can also occasionally melt or decompose, passing through holes in the roof deck and adding combustibles to a second phase of the fire. Fire fighters reaching a blaze typically need to chop a hole in the roof deck to locate the fire and to begin fighting it. These problems are generally even more accentuated in flat roof buildings.

A number of workers have attempted to deal with these fire fighting issues. Shapiro (U.S. Pat. No. 5,483,956) and Smith (U.S. Pat. No. 5,027,741) have devices for aiding in escape from a smoke filled environment. Welch (U.S. Pat. No. 5,927,990) and Astell (U.S. Pat. No. 6,114,948) deal with aiding fire fighters in smoke and flashover situations. L'Heureux (U.S. Pat. No. 5,165,659) improves on methods for opening up shingle/plywood roofs in fires. None of these approaches deal with the basic problems, which are heat and smoke containment and contribution of combustibles from the roof deck.

Sprinklers are an alternative approach that is not often used in small to medium sized buildings because of initial cost, complexity, and difficulty of maintenance. Walls (U.S. Pat. No. 6,003,609) attempts to solve this through a ceiling/roof mounted modular device using fire-retardant chemical released by a fusable link. Anghinetti (U.S. Pat. No. 4,104,834), Morris (U.S. Pat. No. 6,161,348), Veen (U.S. Pat. No. 3,788,013) and Lyons (U.S. Pat. No. 5,960,596) are among a large group of fire vents that release smoke and heat from fires. Some of the factors limiting use of these measures are again cost, inability locate them in the area of the fire, and effective weatherproofing of the roof membrane.

Lighting is one of the highest operating costs for many retail operations. More than 50% of commercial/industrial buildings could use daylighting to cut energy costs, but do not. This may be due to a lack of effective daylighting panels to control lighting and heat buildup, while producing a weatherproof roof deck assembly. This is particularly true of sloped roof metal buildings.

Gumpert (U.S. Pat. No. 5,323,576) has a skylight suited to standing seam roofing, but it has no attenuating or control capability. Christopher (U.S. Pat. No. 5,617,682) and Curshod (U.S. Pat. No. 5,204,777) have light attenuators, but lack an effective means for dissipating heat buildup in the panel. They do not have adequate means for assembling their panels into commercial roofing. Dittmer (U.S. Pat. No. 5,062,247) has a passive heat dissipation system for his panel, but lacks an active daylighting control system.

Many commercial heating and cooling systems have poor efficiency as they work using air source heat pumps having a heating coefficient of performance of 2.2–2.8 and a cooling EER as low as 12. One of the most successful innovations in the HVAC field has been the development and use of (geothermal) ground water heat pumps that can achieve a heating coefficient of performance of 4.5 to 5 and a cooling EER of 20. Such systems are limited, however, by cost of wells and limitations on the availability or suitability of a groundwater source for the heat pumps.

Many integral solar panels built into a roof structure in the prior art have been designed from the standpoint of using glass glazing on a wooden roof structure. Provisions for air or water circulation to the panels and integration into a complete energy management system have been limited. The use of wood and the residential construction methods do not closely match the needs of commercial and light industrial structures. The goal of using solar energy to provide direct heat requires large amounts of storage, high collection temperatures and often duplication of heating equipment to serve as backup. Stout, (U.S. Pat. No. 4,244,355), is typical of this group of prior art.

Wilhelm, (U.S. Pat. No. 4,327,707), utilized a low cost film based collector for retrofit to existing roofs. Though efficient, the invention does not address the distribution system for feeding working fluid to panels through the roof deck. The fundamental drawback of nearly all the prior solar collector art is the lack of a fluid circulation system that moves working fluid to the exterior of the roof deck without sacrificing leak integrity of the roof. Hartman, (U.S. Pat. No. 5,134,827), utilized a good fluid transfer system with a low cost film collector, but did not provide a very good connection to the building frame. A second limitation of most prior solar art is the use of unusual construction methods that do not fit the general skills, training and work habits common in the trades.

In general, the owner or user sees the roof of a typical commercial or industrial building as a liability rather than an advantage.

OBJECTS AND ADVANTAGES OF THE INVENTION

Accordingly, several objects and advantages of the present invention are:

a) to provide a building construction system that is leak tight, easily assembled, allows a good structural connection to the building frame, and accommodates thermal expansion of the roof deck.

b) to provide a connection system for roofing that does not require perforation of the roof deck, and exhibits high insulation performance without the use of foam based insulation that can contribute to the hazard in a fire situation.

c) to provide a fire safety system that allows for release of heat from the interior to prevent building flashover. To improve the ease of location of a fire and fire fighting efforts made from outside the building. To further provide a fire safety system that improves building resistance to an external fire, particularly a forest fire.

d) to provide a roofing system that has an attractive interior appearance, including the easy installation of daylighting. To include integral fluid transfer and heat transfer into a roofing system that can be easily assembled and work in conjunction with efficient heat pump equipment to provide demand side management energy savings.

e) to provide modern control systems for heating, cooling, and daylighting of common commercial and light industrial buildings. Further, to provide an HVAC system that utilizes conventional components and relatively conventional building construction techniques to utilize renewable energy sources in a demand side management system for control of energy usage. To also produce a system capable of low cost distributed power generation.

Further objects and advantages will become apparent from a consideration of the description and drawings that follow.

DRAWING FIGURES

FIG. 4 is an isometric drawing of a light industrial building.

FIG. 5 is a cross section through the joint between two solar panels.

FIG. 6 is a detail drawing of collector and insulating films.

FIG. 11 is a structural and hvac assembly drawing in area of a girder.

FIG. 12 is a cross section showing assembly of an outer joint between panels.

FIG. 13 is a sequential assembly diagram of the joint between panels.

FIG. 14 is an exploded assembly drawing of daylighting panels.

FIG. 15 shows a louver drive mechanism and a four angle I beam in a daylighting panel.

SUMMARY

The basic invention is a structural beam for replacing purlins, with a web portion, flanges roughly perpendicular to the web and angles emerging from the web near the flanges. The new beam serves as the frame for improved insulating, solar, and daylighting panels within a demand side management energy savings system for buildings. An alternate embodiment is a building fire safety system comprising a heat sensitive connector system positioned between building panels, and a connector displacement device. An additional embodiment is a clamping system using a relatively rigid connector, a clamped component, fasteners, and a housing with a roughly dovetail shaped channel.

Figure 1A:
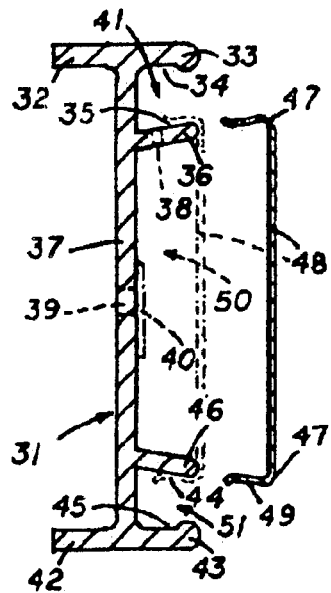
FIG. 1A is a cross section of an angle I beam showing assembly of an air plenum.
Figure 1B:
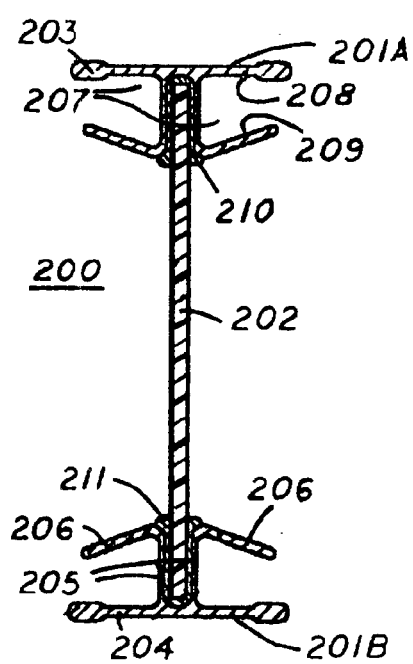
FIG. 1B is a cross section of an alternate angle I beam construction

Description—FIGS. 1A, 1B

FIG. 1A shows a preferred embodiment of the invention in the form of a structural angle I beam 31 that can be used to build a variety of energy and material saving structures. An alternate beam construction and material composition is shown in FIG. 1B. The new beams also provide novel approaches to product and assembly problems in fields such as transportation, infrastructure, material handling/storage, power generation and heat exchange.

In FIG. 1A, beam 31 is assembled to a plenum cover 48 to form an air plenum 50. Beam 31 has a web 37 ending in an upper flange 32 and a lower flange 42 that are both roughly perpendicular to the web. An upper angle 36 emerges from web 37 forming an acute angle to the portion of the web closest to flange 32. Angle 36, flange 32 and web 37 enclose an upper dovetail channel 41. Similarly, a lower angle 46 emerges from web 37 forming an acute angle to the portion of the web closest to the lower flange. Angle 46, lower flange 42 and web 37 enclose a lower dovetail channel 51.

Figure 7:
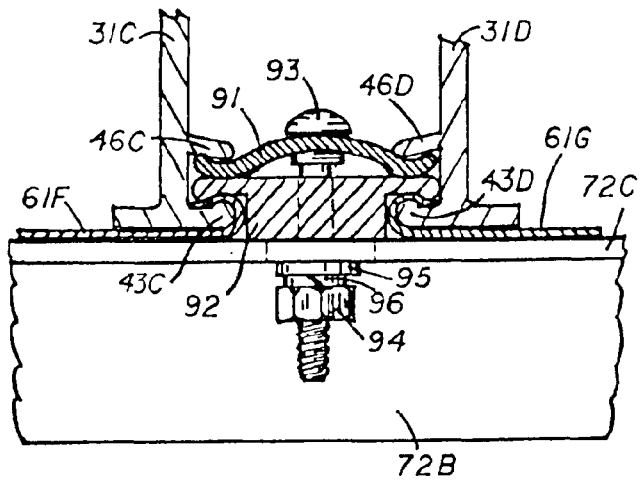
FIG. 7 is a partial cross section through completed panel attachments to the building frame.
Figure 8:
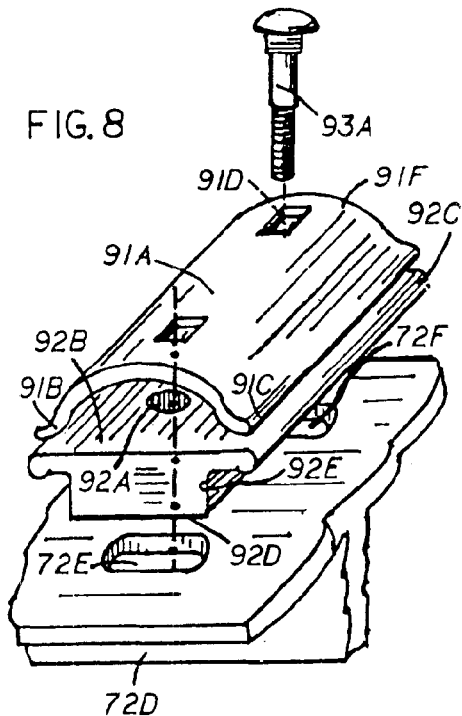
FIG. 8 is an isometric assembly drawing of structural attachment components.

Flange 32 can end in an upper bulb 33. Channel 41 contains an exterior seal surface 34 and an exterior lock surface 35. The upper bulb, seal surface 34 and lock surface 35 assist in weather-stripping and mechanical integrity (FIGS. 4,5). Flange 42 can end in a lower bulb 43. Channel 51 contains an interior connector surface 44 and an interior shelf surface 45. Bulb 43, surface 44, and surface 45 assist in the securing of panels to the building frame (FIGS. 7,8).

Plenum cover 48 is formed with a pair of bends 47 to create a pair of snap legs 49. Legs 49 are roughly congruent to surfaces 35 and 44. The alternate (assembled) position for cover 48 is indicated by dash dot line 48 (FIG. 1A). Plenum 50 is formed from cover 48, web 37, angle 36, and angle 46. After assembly, the snap legs securely contact surface 35, and surface 44 to prevent undesirable air losses.

A series of optional manifold holes 38 can be drilled through angle 36 to connect plenum 50 with channel 41. An air distribution system 173, (FIG. 20), with capability to pipe air to an entire roof of solar collectors is established through the use of the plenums, holes 38, and channels 41. A series of optional charging holes 39-can be drilled through web 37 to permit fill of panels with low thermal conductivity gases. In FIG. 1A, hole 39 is sealed with an optional seal tape 40.

Angle I beam 31 is preferably produced as an aluminum extrusion for cost and best fire retardant performance. Alternatively, it could be produced as a reinforced composite using a phenolic resin and fiberglass reinforcement. Composite materials provide a superior thermal break between the exterior and interior of a building. The preferred material for cover 48 is thin gauge sheet metal. One alternative to this would be pressure sensitive backed foil-scrim-kraft paper (FSK) laminate.

FIG. 1B illustrates an alternate construction and materials choice for beam 31. An alternate angle I beam 200 is illustrated composed of two aluminum flange modules 201A and 201 B and a composite web 202. Each of the flange modules consists of a flange 204 giving rise to two spaced apart bottom sections 205 which turn to form two angle sections 206. Each of the modules forms two roughly dovetail shaped channels 207 between flanges 204 and angle sections 206. Within each channel 207 there is a seal surface 208 and a lock surface 209, roughly opposed to and spaced apart from surface 208. Similarly, an all composite angle I beam 121, shown in FIGS. 14 and 15 represents yet another materials choice.

Each flange 204 ends in two elongated bulbs 203 that extend above and below the surfaces of the flange. Surface materials will be attached to the flange at the bulbs only, limiting the heat transfer through the part.

Module 201A is bonded to web 202 using an external adhesive 210 where module 201A is positioned at the building exterior. Module 201B is bonded to web 202 using an adhesive 211 where module 201B is positioned at the building interior. Adhesive 210 is preferably a semisolid material at service temperatures allowing the module some freedom of thermal expansion relative to web 202. Adhesive 211 is preferably a structural thermoset material for effective load transfer to module 201B.

Web 202 is preferably a composite consisting of continuous strand mat and fiberglass roving with a phenolic resin matrix. A variety of other matrix materials can be used where fire retardance is not an issue, such as greenhouse assemblies. The thermal conductivity of these materials is on the order of 0.24 W/m K versus a thermal conductivity for steel of about 60 W/m K. A 3.2 mm (0.125") composite web will then have only about 3% of the heat transfer of a 0.46 mm (0.018") sidewall of a prior art steel structural insulated panel. An alternate material choice for web 202 would be a forest product based material.

Figure 3A:
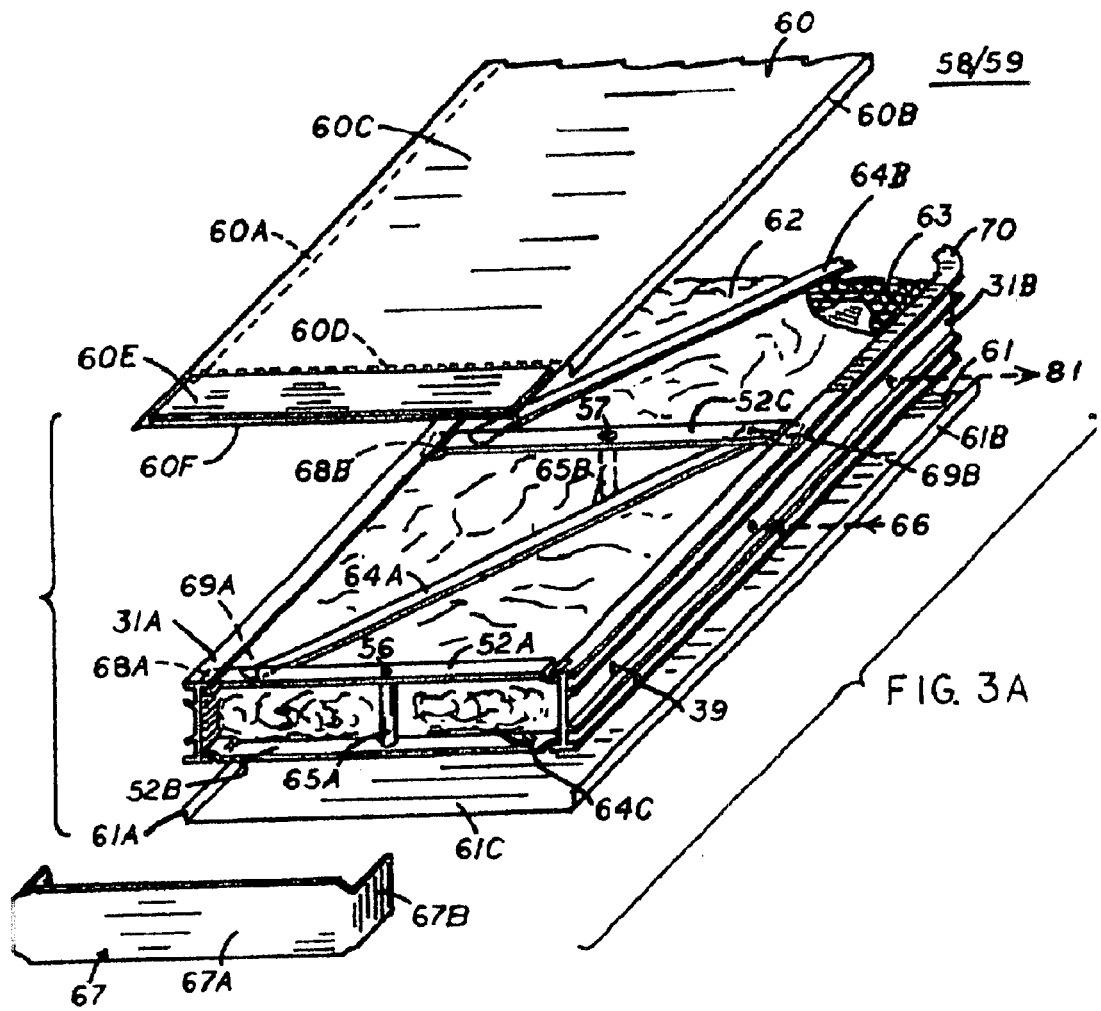
FIG. 3A is an exploded assembly drawing of basic insulating and solar panel structure.
Figure 3B:
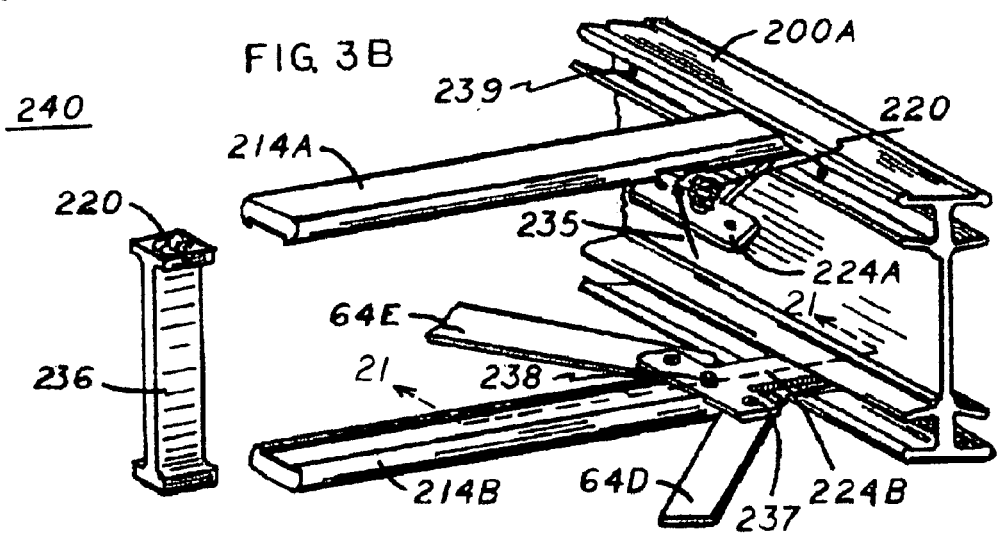
FIG. 3B is an assembly drawing for an alternate panel assembly system

Beam 200 can also be used with a variety of holes such as those shown in FIGS. 1A, 3A and 3B to distribute flow of process fluid and insulating gases. The air distribution systems shown in FIGS. 1A, 3A, 5, 6 10, 13, 15, 17 and 20 can also be used exchangably with beam 200 or any of the other similar beams disclosed throughout the patent.

A high degree of mechanical strength can be expected from these beams, especially where they will be used to replace steel purlins in the building construction. The upper dovetail channels can be used as shown here and described in U.S. Pat. No. 5,134,827 to provide both weather-stripping and mechanical connections between prefabricated panels. The lower dovetail channels can be used as shown in FIGS. 7,8,11, and 12 to provide a structural connection between panels and building frame members.

It is not desired to limit applicability of beams 31 and 200 to a specific structural assembly system. The use of angle I beam 31, beam 200 and composite angle I beam 121 (FIGS. 14–17) to produce roof deck panels represents a single field of for the embodiments described in this specification. Angle I beam 31, beam 200, beam 121 and the variations described above have a variety of other structural applications:

A few of these would be girders, supporting walls, roof decks, floors, or bridges. The dovetail shaped channels afford locations for attachment of a variety of cross bracing, diagonal bracing (FIGS. 2B, 3B) and/or bridging (not shown) normally associated with girder and open truss work construction.

Figure 23:
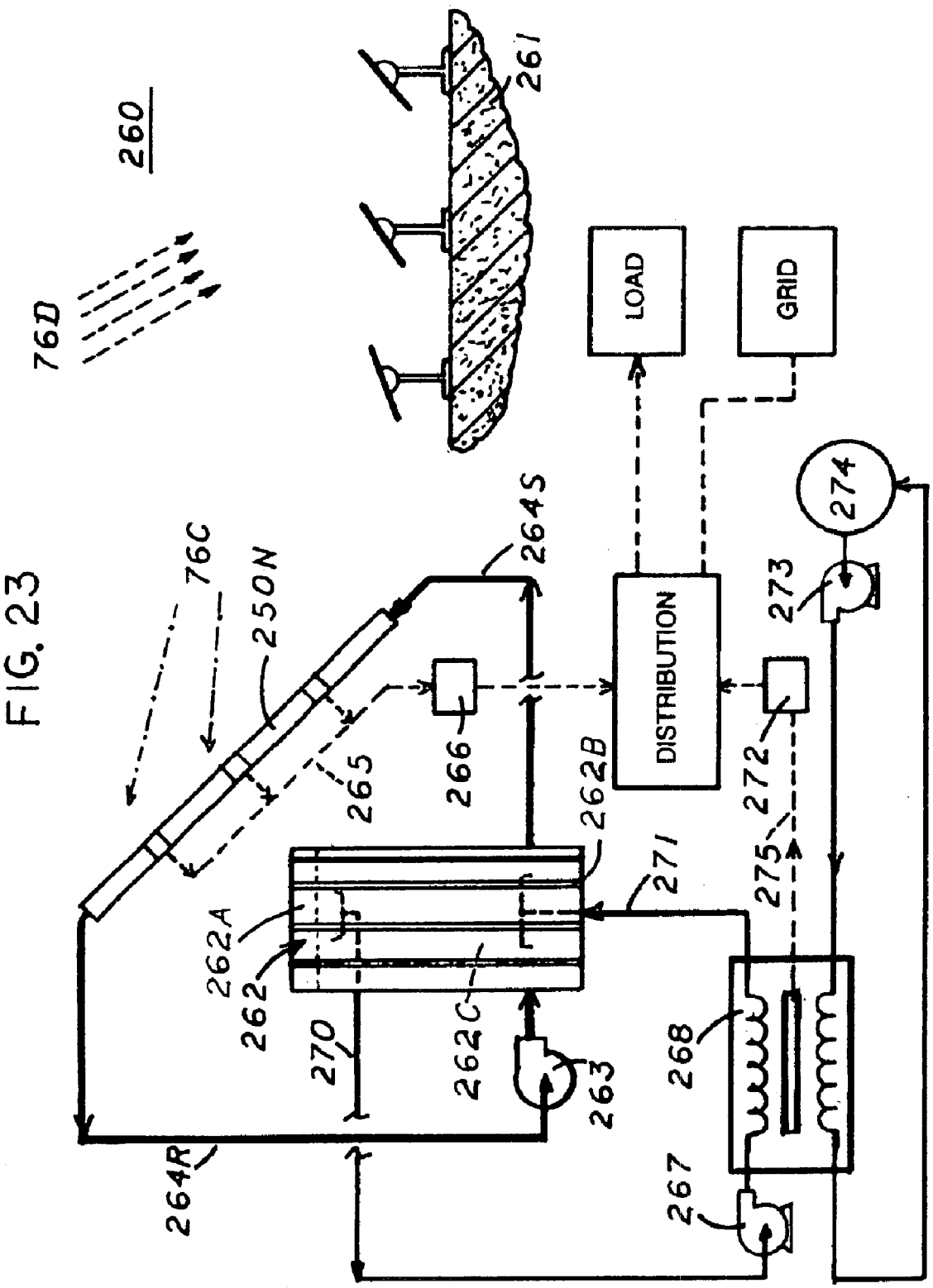
FIG. 23 is a schematic of a distributed electrical power system

Other potential applications of the present invention would be structural framing for transport vehicles and support framing for signage. A unique application for the present invention is as stringer in a lightweight, easily returned, material handling pallet, (FIG. 24). Another would be thermal storage tanks with heat exchange surfaces and materials storage tanks in general, (FIG. 23). Other applications will emerge from examination of the balance of the specification and claims.

Description—FIGS. 2 Through 6

FIGS. 2A through 6, 9 and 21 illustrate an alternate embodiment of the invention in the form of functional building panels based on the beams of FIGS. 1A and 1B. The panels provide demand side management (DSM) energy savings for building users and an improved means for assembling structures. An insulating panel 58 and a solar panel 59 are used in the construction of a commercial, agricultural or light industrial building 71 with a low cost, highly insulating, integral solar collector roof.

Figure 2A:
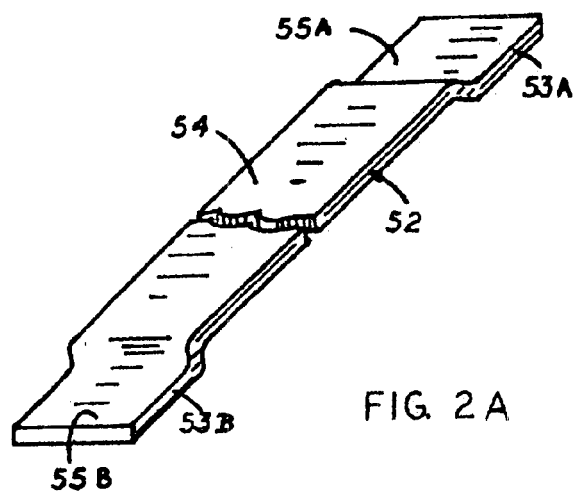
FIG. 2A is an isometric drawing of a cross brace used in panel construction

FIG. 2A shows a cross brace 52 used in the insulating panel, the solar panel and a daylighting panel 141 shown later. A central strut 54 is bent into attachment tabs 53A and 53B on either end. The tabs carry bonding surfaces 55A and 55B.

Figure 2B:
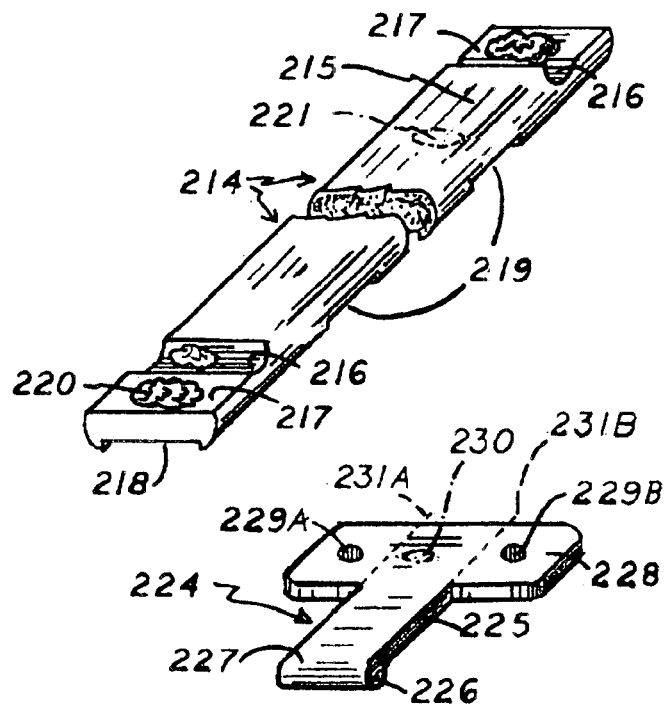
FIG. 2B is an isometric drawing of an alternate cross brace and rigid connector for panel construction

An alternate shape for brace 52 is shown in FIG. 2B. The elements of a clamping system 240 for assembling panel frames are shown in FIGS. 1B, 2B and 3B. Cross brace 214 is a bar shaped profile with rounded sides and a ventral slot 218. Brace 214 is shaped at both ends with a gullet 216 and a flat 217 cut into the dorsal surface. The ends of brace 214 are then roughly congruent to surface 208.

FIG. 2B also shows a relatively rigid connector 224. Connector 224 has a lever portion 225 and a tip portion 226 at an angle to the lever portion. Both parts have a width slightly less than slot 218. A convex surface 227 between portions 225 and 226 serves as a pivot point which rests against slot 218 as the connector is being actuated; (shown by arrow 235 FIG. 3B). A tee portion 228 is the final part of connector 224 and has two through holes 229A and 229B. An optional tapped hole 230 can be cut at the center.

FIG. 3B shows the assembly sequence for beam 200A, brace 214 and connector 224. Cross brace 214B assembled to beam 200A in the lower part of the figure. Cross brace 214A in the process of being assembled in the upper part of the figure. In both cases, gullet 216 fits tightly and conforms to bulb 203, while flat 217 fits tightly and conforms to surface 208 as the braces are first put in place and then secured. The system allows for secure joining of materials regardless of material types.

Brace 214B has tee portion 228 of connector 224B aligned and fitting into a transverse slot 219 in the brace. Tip portion 226 is pushing against surface 209 and clamping the shaped end of brace 214B against surface 208 of the lower channel of beam 200A. An adhesive 220 is forming an adhesive bond between gullet 216, flat 217 and surface 208 while the assembly is secured by optional screw 238 which has been moved through hole 221 and threaded into hole 230. Adhesive 220 can be optionally placed between connector 224A and slot 218 to provide additional anchorage, (see also FIGS. 2I, 1B and 2B)

In FIG. 3B, Diagonal braces 64D and 64E are attached to connector 224B using rivets 237 which pass through holes 229 and are connected to other joints (not shown) on the opposite side of the panel. Either or both sides of tee portion 228 can be omitted as shown by dashed cut lines 231A and 231B (FIG. 2B) to accommodate situations where diagonal bracing is not called for.

In FIG. 3B, brace 214A is being assembled using adhesive 220 to secure connector 224A into slot 218. Surface 227 is riding against slot 218 while tip portion 226 is moving toward contact with surface 209 of the upper dovetail shaped channel. A beam segment 236 can be used as a load transfer member between the two faces of the panel. Segment 236 has flanges with a width less than that of slot 218 and is adhesively bonded to braces 214A and 214B in the final assembly.

Segment 236 is preferably made from a composite material for insulation. Brace 52, brace 214 and connector 224 are preferably made from aluminum. Alternatively, they can be produced from composite materials. Clamping system 240 affords a means to attach many types of materials to one another, without direct use of fasteners passing through the joint. (Beam 200A is of the same type as beam 200, material details for 200A are omitted for drawing clarity.)

A basic structure for both the insulating panel and the solar panel is shown in FIG. 3A. Differences between the two types of panels are illustrated by comparison of FIGS. 5 and 9. Beam 31A and beam 31B form the side rails for the panels. A series of cross braces 52A, 52B, 52C etc. attach to upper flanges 32 and lower flanges 42 at a series of attachment points such as 68A, 68B etc. to create a box beam frame (not numbered). The alternate style angle I beam 200 can also be utilized for constructing the panels shown.

Overlap areas 69A, and 69B show locations where a diagonal brace 64A is affixed to cross braces 52A and 52C to provide stiffening. A series of diagonal braces 64A, 64B etc. is attached at the upper part of the panels and series of diagonal braces represented by brace 64C is attached at the lower parts. The preferred method of attachment for the cross braces and the diagonal braces is ultrasonic welding of the aluminum. Alternate methods of attachment are adhesive bonding and fasteners such as rivets.

An insulation batt 62 is inserted after assembly of the frame. An insulation facing 63 is optionally laminated to batt 62. Facing 63 is preferably a foil-scrim-kraft laminate which aids in producing a radiant barrier effect at the exterior of the panel. The preferred material for batt 62 is fiberglass. Alternative materials are fire resistant treated recycled paper, or mineral wool. These and other fire resistant materials offer significant safety advantages over many of the foam materials used in conventional structural insulated panels and flat roofing, while offering excellent insulating properties.

After insertion of batt 62, a tube support 65A is placed through the insulation between a through hole 56 that has been pre-drilled and countersunk in each of the cross braces that the tube support spans. A screw 57 is placed in each of the holes 56 and threaded into each of the tube supports to secure it. A series of tube supports such as 65B connect the upper and lower cross braces in the structure and serve to distribute the exterior load from an outer skin 60 to an inside skin 61. The tube supports are preferably made of a fiberglass composite, alternative materials would be ceramics and wood.

An end cap 67 is inserted into the end of the panel to secure and brace the end. The end cap consists of an end plate 67A bent around into two end tabs 67B. Tabs 67B have a height slightly less than the spacing between braces 52A and 52B. Plate 67A has a height equal to the spacing between braces 52A and 52B. Cap 67 is preferably formed from aluminum sheet and perimeter welded to braces 52A, 52B, and beams 31A, 31B. Alternatively, it can be adhesively bonded or use standard fasteners.

Both the insulating panel and the solar panel are constructed with outer skin 60 and inside skin 61 bonded to the cross braces and the angle I beams. To decrease thermal conductance through the panel an optional adhesive tape 70 can be used between the panel frame and the skins. Tape 70 is preferably a woven glass tape coated on both sides with a high temperature pressure sensitive adhesive. Alternate materials would be any non-conductive fabric. Inside skin 61 is roll formed into a left bottom edge 61A and a right bottom edge 61B with a skin interior surface 61C being left flat for bonding to lower frame members. As shown in FIG. 5, edge 61A and edge 61B are formed around lower bulbs 43A and 43B. Inside skin 61 can be bonded to the lower flanges and frame using an adhesive 70A.

Similarly, outside skin 60 is formed into a left flap 60A and a right flap 60B. The left and right flaps do not extend beyond bend line 60D, where an end flap 60F is located. An end gasket 60E is adhesively bonded to the end flap. An outer paint surface 60C ultimately serves as the anchorage for a capillary film 80. A preferred method of bonding the outside skin to the upper flanges and the cross braces is tape 70 alternatively adhesive 70A can be used.

At a later point in panel assembly, the left and right flaps are formed around the upper bulbs as shown in FIG. 5. The end flap is then bent down at line 60D and adhesively bonded to end plate 67A, (not shown after bending). At that point, the withdrawal of air; flow 81 from the panel through holes 39 can be utilized to create a partial vacuum which serves to clamp the adhesively bonded skins until cure is complete. The air can then be replaced by a flow of Argon gas 66. Other low thermal conductivity gases such as Krypton and perhaps carbon dioxide are acceptable alternatives.

The basic cost elements of the new panels; the skin layers, the insulation batt, and beams are similar to cost elements in conventional building construction. The elements of the composite web and the Argon filled fiberglass yield superior energy savings performance at a low cost. Assembly costs are expected to be lower due to less passes across the roof to produce the structures.

Figure 9:
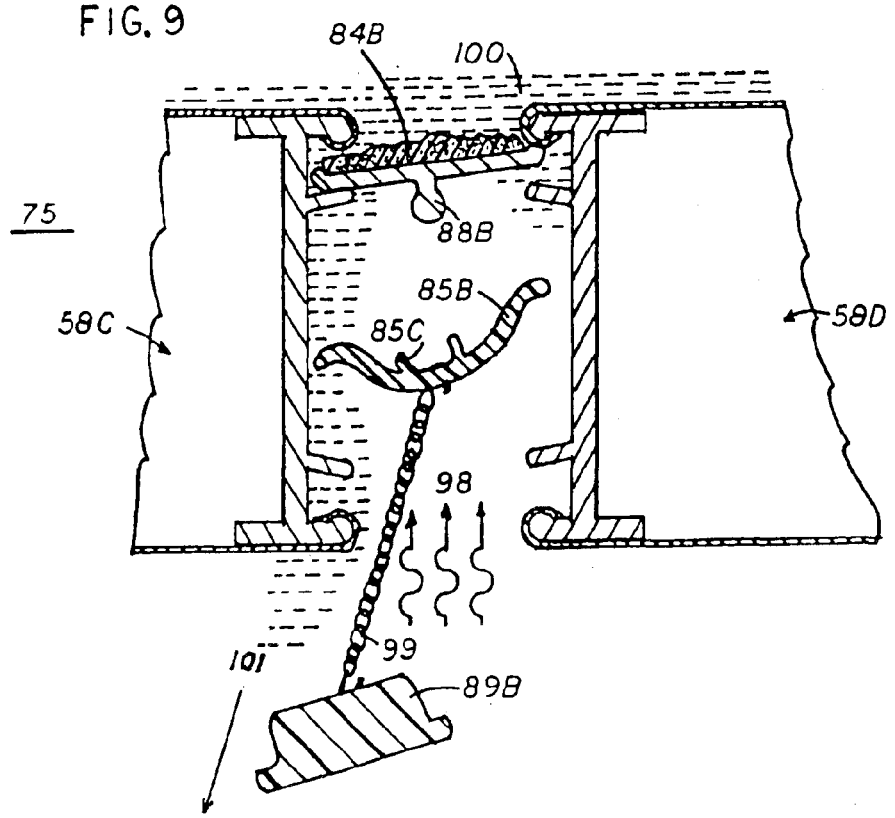
FIG. 9 is a cross section through an insulating panel joint in the area of a fire.

FIG. 4 shows the present invention utilized in the construction of light industrial building 71 with a salt box shape. A number of girders 72 support a south roof deck 73 and a north roof deck 74. The roof decks are composed of a number of insulating panels 58 and solar panels 59. End gasket 60E is shown between two panels weather-stripping the joint between them. The drawing also shows a fire 97 which has broken out in the building and is emerging from the roof deck with an evolution of smoke. The section view of FIG. 9 illustrates the fire resistant capabilities of the present invention and modes of assistance to fire fighting personnel.

FIG. 5 is a cross section through the roof showing the assembly and utilization of solar panels 59A and 59B in roof deck 73. The panels are mounted to girder 72A and spaced apart by the width of an interior strip 89A. (A chain 99, similar to that shown in FIG. 9 is omitted for clarity). There is a left plenum cover 48A secured to solar panel 59A to create a left air plenum 50A and a right plenum cover 48B secured to solar panel 59B to create right air plenum 50B. A connection boot 79A and a connection boot 79B are enclosed by plenums 50A and 50B respectively. A branch tee 78 enters boot 79A, boot 79B, (see also FIG. 10 ) and a supply duct 77.

The lower part of the drawing shows how inside skin 61D and inside skin 61 E are bent around lower bulb 43A and lower bulb 43B in fabricating the panels. The skins are bonded to the lower flanges using adhesive 70A. Similarly, the outer skins are formed around the upper bulbs and bonded to the angle I beams with adhesive tape 70. This is also shown in FIG. 6, where outer skin 60J is formed around upper bulb 33A. Optionally, outer skin 60J can be ultrasonically welded to exterior seal surface 34A.

Two capillary films 80A, and 80B are formed around the upper bulbs of the solar panels and enter the upper dovetail channels. An optional insulating film 83 is bonded to film 80B and forms the exterior surface of the panel. A similar insulating film, (not numbered), is bonded to film 80A. (Some hatching for insulation batts 62A, and 62B has been omitted to allow room for numbering)

The exterior joint between solar panels 59A and 59B is provided according to U.S. Pat. No. 5,134,827 to Hartman: A flexible connector 85A is shown in it's unactuated, (solid line) and actuated, (dash-dot line) positions. The flexible connector engages an exterior bracket 86 with a pair of grippers 85D which snap over a connector bulb 88 as the joint is assembled. Some preferred materials for connector 85A are fire retardant/high temperature thermoplastics such as: polysulfone, polyvinylidine fluoride, or polyetherketone. A variety of other materials can also satisfy the functional requirements for the flexible connectors used in a fire safety system, (see also FIG. 9). Preferred material for the exterior bracket is aluminum with fire retardant plastics being an alternative.

In the actuated position, a pair of tips 85E on the connector and a pair of ridges 86E on bracket 86 engage the interior surfaces of channels 41. Panels 59A and 59B are locked together and a weather-strip seal is formed as a foam strip 84A is pushed against the upper bulbs. An adhesive film 87 secures foam strip 84A to bracket 86. During installation, chains 99 are hooked between the flexible connectors and the interior strips 89A (FIG. 5), (see also FIG. 9 interior strip 89B).

FIG. 6 shows details of the films on the solar panels and arrangement of exterior layers. Capillary film 80C is shown as a sheet with a number of ribs 80E on its ventral surface. The ribs are thermally bonded to outer paint surface 60C in the final assembly. Insulating films 83 and 83A consist of a series of semicircular cells that are closed down at the ends to produce stagnant air pockets. In the assembly process, capillary film 80C is bent around upper bulb 33A following arrow 80D, and adhesively or thermally bonded to seal surface 34A and/or skin 60J. Insulating film 83A is bonded to capillary film 80C at the troughs between pockets and the ends.

An alternate capillary film 90 is a method of addressing the deformation of ribs 80E as capillary film 80C is bent around bulb 33A. Film 90 consists of a plastic sheet 90A with a grid of risers 90B on its ventral surface for bonding to can be printed onto plastic sheet 90A using a high build polymer resin applied with stencil printing equipment. Alternatively, they can be thermoformed into plastic sheet 90A or produced using a variety of other techniques. A number of other riser shapes can be used with this system. It is not desired to limit the invention to the squares shown.

The capillary films and insulating films are preferably produced from polyvinylidene fluoride, (PVDF), with outer painted surface 60C produced from a commercially available PVDF based paint. Alternates would include polyurethane films bonded to a polyurethane paint system or acrylic/polycarbonate.

Operation—FIGS. 5 and 6

FIGS. 5 and 6 demonstrate the operation of solar panels 59 installed in roof deck 73 for solar collection purposes. They also illustrate the utilization of the panels in general heat exchange applications such as night sky cooling.

In a heating mode of operation: A cold airflow 81A is shown passing through duct 77 and splitting into a flow 81B which enters branch tee 78. Flow 81B splits again into air flow 81C, which enters boot 79A, boot 79B, plenum 50A, and plenum 50B.

An air flow 81D passes through manifold holes 38A in the upper angle of panel 59A and subsequently through capillary film 80A at the exterior of the structure. It is warmed by sunlight 76 impinging on the insulating film and becomes a warm air flow 82A moving through the capillary film.

Similarly, an air flow 81E passes through holes 38B in the upper angle of panel 59B and subsequently through film 80B. It becomes a warm air flow 82B moving through the capillary film. Both flow 82A and flow 82B return to the next panel joints, which return air to the heating system. (see FIG. 20)

The films, ribs, semicircular cells, and risers in the drawings are shown enlarged for the purpose of illustration. It is desirable to have a thin gap between the capillary film and the outer paint surface to increase air velocity and the heat transfer rate.

The use of Argon gas 66 generates a 40–45% insulation improvement over conventional fiberglass/air systems. Estimated domestic energy savings from insulation improvements are estimated at 98 petajoules, (93 trillion Btu), in year 12 and 171 petajoules, (162 trillion Btu), in year 20. (Based on growth to 15% of non-residential construction in year 20).

A mathematical model developed for the solar panels over the heating season in Boston, Mass. gave the following results: Collector efficiencies ranged from 29% in December to 49% in April. The collectors provided between 107% and 442% of the monthly heat demand of the HVAC system. For a 465 m$^2$, (5000 square foot), building, heating savings averaged $133/month compared to a typical air source heat pump in a conventional metal building.

In a cooling mode of operation: Radiant heat losses to the night sky can be used to cool a thermal reservoir and/or serve as the heat sink to a heat pump (see also FIG. 20). The flow arrows in FIG. 5 remain the same with the exception that air flow 81A becomes a warm air flow that is cooled by radiant and convective heat losses to become cool air flows 82A and 82B returning to the energy system. In regions where building cooling is the primary need, the insulating film can be omitted in the panel assembly as it would inhibit heat losses from the solar collector panels for night sky cooling.

FIG. 5 also illustrates the unactuated state of a fire safety system 75 discussed in detail in FIG. 9. FIG. 9 shows the actuated fire safety system taken at a point in time when fire fighters have arrived.

Description—FIGS. 7 and 8

FIGS. 7 and 8 show an alternate embodiment of the invention in the form of a structural connector system 118 for securing panels to building frames. FIG. 7 illustrates the assembled connector system. FIG. 8 is a pre-assembly isometric of the components. Generic solar, insulating or daylighting panels in the assembly are represented by beams 31C and 31D that have inside skins 61F and 61G formed around lower bulbs 43C and 43D. (Beams 31C and 31D are also meant to represent constructions based on alternate angle I beam 200.)

Beams 31C and 31D are attached to girder 72B which consists of a beam flange 72C and a beam web 72D. This approach separates structural attachment from weather-stripping. The use of self-drilling screws to try to accomplish both of these tasks in the prior art results in many of the problems associated with conventional metal buildings.

A structural connector 91 has a major arch portion 91F that continues into two minor arched portions 91B and ends at two rounded tip portions 91C. Connector 91 is shown with a length approximately equal to the width of girder 72B. A structural bracket 92 works with connector 91 to clamp and secure beams 31C and 31D to each other and to flange 72C.

A pair of punched apertures 91D in the connector and a pair of bracket holes 92A in the bracket allow passage of carriage bolts 93 and 93A through the connector system. A pair of elongated holes 72E and 72F in flange 72C serve as attachment points to the building frame. The roof deck is assembled to the girders using a flat washer 95, a lock washer 96 and a nut 94 that is tightened from the inside of the building to slightly flatten unactuated shape 91A (FIG. 8) to the actuated shape of rigid connector 91 seen in FIG. 7.

A lower bracket surface 92D is flush against beam flange 72C in the completed assembly. An upper bracket surface 92B serves to resist and deflect movement of the minor arched portions during actuation, directing tip portions 91C into engagement with lower angles 46C and 46D. A pair of bracket ends 92C engage lower bulbs 43C and 43D to secure the panels, resist lateral movement, and wind uplift of the roof deck. Connector 91 is a relatively rigid component in comparison to the flexible connectors of U.S. Pat. No. 5,134,827. In the structural connector system, the width change on actuation from tip portion 92C at the right to tip portion 92C at the left does not change to the extent that flexible connectors do in this prior patent. The thickness/relatively rigid material choices for connector 91 allow for a true structural connection to be formed.

The preferred materials for the rigid connectors and the structural bracket are aluminum extrusions where the angle I beams are composed of aluminum. Other suitable materials would be steel, spring steel and reinforced composites. The most common material used in the girders is steel. Holes 72E, and 72F can be cut into existing or new beams using a portable hydraulic punch system, (not shown).

An alternate construction of the present invention would use both an elongated rigid connector 91A and an elongated structural bracket 92 containing four sets of holes for the carriage bolts. Two carriage bolts would engage beam flange 72C and two carriage bolts would serve to secure the connection between the panels outside the width of the beam.

Replacement of conventional purlins with the angle I beams and the method of assembly from within the building offer shorter construction times for the builder and safer conditions for the workers, who no longer have to operate from the outside of the structure. This approach to building assembly separates structural attachment from weather-stripping. The use of self-drilling screws and steel purlins to try to accomplish both of these tasks in the prior art results in many of the problems associated with conventional metal buildings.

The flexible connectors, (FIG. 5), allow for expansion and contraction of the roof deck in a direction perpendicular to the angle I beams. The structural connector system can allow for expansion and contraction parallel to the angle I beams. Problems with expansion and contraction of roof decks are one of the key causes of leakage and complaints for prior art roofing systems.

It is not desired to limit the structural connector system to the specific application described here. The structural connector system can be used to clamp a variety of components, as a removable assembly (as shown here) or used in conjunction with adhesives (not shown) to form permanent assemblies. Panels formed from other beams cited in the invention, e.g. beam 200, FIG. 1A, can be attached to frame members in an identical manner using the structural connector system.

The capability of structural connector system 118 is not strictly limited to dovetail shaped channels as the clamping action entails tip portion 91B working against interior connector surface 44 (FIG. 1A) to maintain a normal force between bracket 92 and interior shelf surface 45. This can be achieved without the use of a dovetail shaped channel, as long as two roughly opposed surfaces are provided.

Operation—FIGS. 4, 5 and 9

An alternate embodiment of the invention relating to a building fire safety system 75 is shown in FIGS. 4, 5 and 9. The central feature of the system revolves around flexible connector 85A being produced from a thermoplastic material that will deform and release in the extreme temperatures of a fire but not during normal operation. System 75 opens up opportunities to limit flashover and smoke buildup in a metal building fire and make fire fighting operations safer and more effective.

FIG. 5 shows the fire safety system assembled and in place before fire. FIG. 9 shows the altered structure and action of the fire safety system during fire 97 shown in FIG. 4 after the arrival of fire fighting personnel, (not shown). FIG. 5 depicts a connection between two solar panels, while FIG. 9 depicts a connection between insulating panels 58C and 58D. The fire safety system can be utilized with a variety of different types of panels within the present invention or with other construction methods not discussed here.

As shown in FIG. 5: connector 85A is initially attached to exterior bracket 86 by means of a pair of grippers 85D which engage bulb 88.

As shown in FIG. 9: Wavy arrows indicate heat 98 rising from the interior to actuate the fire safety system. The heat has caused a deformation of the shape of strip 89A to the shape of interior strip 89B. The concave edges shown in FIG. 5 have melted and released the interior strip from the space between the lower bulbs. Strip 89B is falling under the influence of gravity, vector 101, and has opened a space between panels 58C and 58D. The heat propagating between the angle I beams has softened/deformed flexible connector 85B to the shape shown. Strip 89B is shown pulling connector 85B downward by means of chain 99, which was attached to both the connector and the strip in the construction process.

In FIG. 9, grippers 85C have released from connector bulb 88B. Heat impinging on the aluminum exterior bracket has melted and shrunk a foam strip similar in shape to 84A to the shape of foam strip 84B, releasing the exterior weather-strip seal. The configuration of system 75 can be arranged to hold the frangible components of the roof deck captive to prevent debris falling from the roof during the fire.

FIG. 9 occurs later in the fire relative to the time frame of FIG. 4, where flame and smoke have appeared on the roof in the area of the fire. In FIG. 9, fire fighters (not shown) have arrived, identified the area of the fire from the emerging smoke and are spraying the fire with water 100. The water has run down the roof deck, is moving through the space between panels 58C and 58D, and is entering the building in the area of the fire. As the panels are mounted horizontally across the roof deck, the area corresponding to heat release is the same area that will receive the bulk of water applied by fire fighters.

In a conventional metal building, particularly a sloped roof 'systems' building, fire fighters ordinarily have a difficult time locating a fire. They often have to cut a hole in the roof to put water on the fire. Very often, the interior of the building has already flashed over because heat and smoke are contained by the metal roofing system and fiberglass insulation. Exposed fiberglass insulation can be a source of smoke if binder content is high. Fire safety system 75 provides means to detect the location of a fire, to release heat/smoke from the building, (slowing flashover) and to aid in fire fighting while reducing personal hazard to the occupants and the fire fighters. Replacement of foam in common structural insulated panels with fiberglass/Argon, greatly reduces combustibles in the roof deck and smoke evolution.
Description/Assembly—FIGS. 10 to 13

Figure 10:
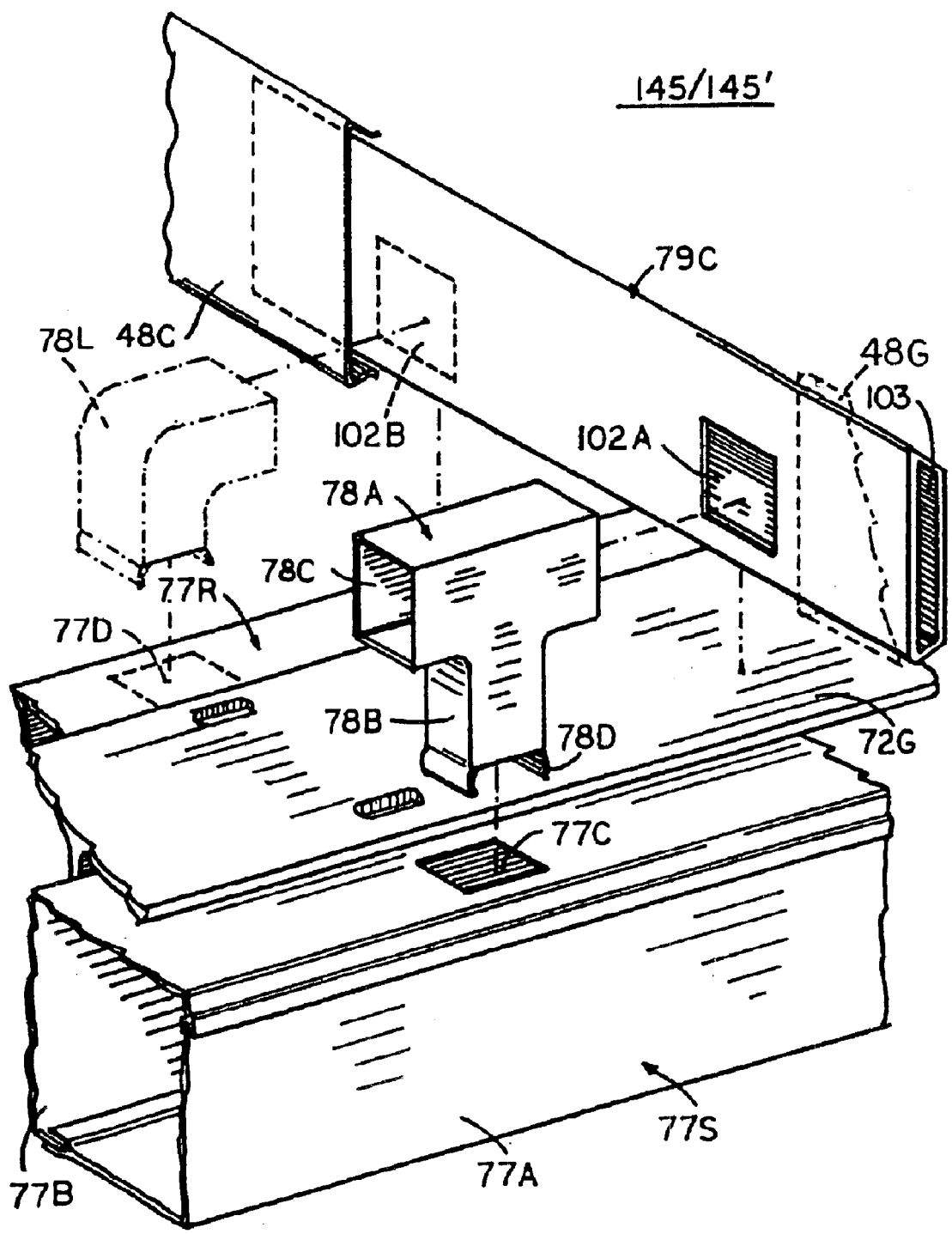
FIG. 10 is an exploded assembly drawing of an air distribution assembly.

FIG. 10 details an air distribution assembly 145 consisting of branch tee 78A, connection boot 79C, plenum covers 48C and 48G, a supply duct 77S, a return duct 77R, a duct aperture 77C and a tee aperture 102A. Assembly 145 enables the construction of a demand side management system 180 (FIG. 20) that is a preferred embodiment of the present invention and connects with the plenums that are a key functional element in FIGS. 1A through 5. FIGS. 11 through 13 describe the sequence of assembly for a typical embodiment of the invention, a commercial building 148 with daylighting, (FIGS. 14–20).

The branch tee has a main portion 78B and a branch portion 78C which distributes flow to two connection boots, (only one is shown in FIG. 10). It is preferably formed from sheet metal and extends down to two snap tabs 78D which secure the branch tee in supply duct 77S by insertion into duct aperture 77C.

The supply duct consists of an outer duct section 77A and an inner duct section 77B which is secured to girder 72G. The two duct sections are shown assembled using conventional sheet metal snap seams. Aperture 77C lies outside the edge of the flange of girder 72G. Tee 78A would be inserted into aperture 77C after the structural connection between panels was established, (see FIGS. 7–8 and 11–13). The structural connections to the beam and the panels themselves have been omitted in this drawing to clearly illustrate the air distribution assembly.

Return duct 77R is mounted on the far side of girder 72G and carries a duct aperture perforation 77D which has not been opened by the installer. At the next joint between panels, the next duct aperture in duct 77R will be opened and used to pipe return process air back to the DSM system.

As tee 78A is placed into duct aperture 77C, branch portion 78C is pushed into a tee aperture 102A and the corresponding tee aperture in the connection boot nearest the observer, (not shown in order to provide a clear illustration). Dashed aperture 102B indicates the position of the tee aperture if the viewed air distribution assembly were to be used for return air.

Boot 79C is placed between appropriate angle sections of angle I beams in the construction, (not shown). Plenum covers 48C and 48G are placed over the upper and lower angles of appropriate panels, (not shown) and contain/seal the ends of boot 79C. In completed assembly 145, supply air from duct 77S will pass through the branch tee into a lumen 103 at the interior of the connection boot and into the corresponding air plenum as illustrated in FIG. 5.

Tee 78A is preferably made from sheet metal. Alternate materials would be rubber, blow molded or injection molded thermoplastics. Boot 79C is preferably made from rubber, an alternate material would be a thermoplastic elastomer extrusion. Supply duct 77S and return duct 77R are preferably made from sheet metal. Acceptable alternate materials would be fire retardant composites.

The sequence for the air distribution assembly would be to install the connection boots and plenum covers after the structural connections shown in FIGS. 7 and 8. The supply and return ducts as well as the branch tees could be installed before the actions shown in FIGS. 12 and 13.

An alternate configuration 145' of assembly 145 would employ an elbow 78L to utilize and connect aperture 102B to aperture 77D. At each panel joint, a second elbow, (not shown) would connect duct aperture 77C with the corresponding tee aperture closest the observer, (not shown). The alternate configuration would produce air flows up the roof deck through the capillary films in all the solar panels. Each panel joint would contain a supply and a return connection going to the supply and return ducts. This might be advantageous from a heat transfer perspective.

FIGS. 11 through 13 show the installation sequence common to the radially expandable edge connector system of U.S. Pat. No. 5,134,827 and the structural connector system described in FIGS. 7 and 8.

FIGS. 11 through 13 also introduce parts used in FIGS. 14 through 20. They show a structure without the fire safety features of FIGS. 5 and 9 and an I beam girder 108 instead of tee beam girder 72 shown earlier. The figures demonstrate the general applicability of the angle I beam based panels and the air distribution system to a variety of connector types and building frames.

FIG. 11 looks down the roof slope toward two solar panels 59C and 59D that have been assembled earlier. The next panel 59E that will run across girder 108 has not as yet been placed. Structural bracket 92F is first placed on girder 108 followed by structural connector 91E and carriage bolts 93B and 93C. As panel 59E is placed across girder 108, the structural bracket serves to establish proper spacing on the roof as bracket sides 92E, (FIG. 8), butt against the lower bulbs of solar panels 59C, 59D, and 59E, (FIGS. 12, 13).

As panels 59C and 59D are pushed toward one another, arrows 104, end gasket 60E forms a seal between the panels.

The structural connector is then actuated by tightening bolts 93B and 93C to establish the connection between the panels and the building frame.

The weather-strip/outside connection can then be assembled by first sliding an exterior bracket 109B through the space between upper angles 36E and 36D into upper dovetail channel 41B. Exterior bracket 109B is then rotated, arrow 110, into position to span channels 41A and 41B.

Covers 48D, 48E and 48F are then installed. Bracket 109B has an exterior bracket seal 109A and a pair of screw ledges 109C. A flex connector 111 is then assembled to bracket 109B using a series of self tapping screws 112 driven by a nut driver extension 113 and a portable drill 116. On completion of the joint according to U.S. Pat. No. 5,134,827, seal 109A is pushed against upper bulbs 33E and 33D to weather-strip the joint. Final steps in the joint assembly are placement of an insulation batt 115 into the space between the panels and locking an inside strip 114 into place as the interior facing of the joint. At a later point in the building assembly, duct sections 77E and 77F can be attached to girder 108 by means of bolts 107. Dashed duct section 77G is shown before (dashed) and after (solid) it has been snapped onto duct section 77F. A decorative duct cover 105 is snapped arrow 106, over the supply/return ducts and beam 108 to provide an interior surface in the completed building.

Brackets 109B, and 109D are preferably formed from the same materials as exterior bracket 86. Flex connectors 111 and 111A (FIG. 17), are preferably formed as flexible composites produced using resins such as the newer thermoset urethanes produced by several manufacturers. Alternative materials would include fairly rigid thermoplastic elastomers or filled thermoplastic extrusions.

A conventional metal building is assembled in a series of passes across the roof deck. Some of these are: 1)attachment of purlins, 2) insulation rollout, 3) insulation stapling, 4) attachment of corrugated sheets, 5) sealing of standing seam or corrugated overlap joint, and 6) perimeter sealing. The present invention appears to be capable of assembly in one or perhaps two passes across the roof deck, allowing for considerable labor savings and profit improvement for the contractor. Because most of the work can be done from a lift platform inside the building, further improvements in crew safety and productivity can be expected compared to conventional operations conducted from outside the roof deck.

Description—FIGS. 14 Through 18

FIGS. 14 through 18 depict an alternate embodiment of the invention in the form of a daylighting panel 141 installed in commercial building 148. Panel 141 is assembled from composite angle I beams 121 and 121A (FIG. 14). The daylighting panels can be integrated into a flush, leak proof roof deck to save lighting costs for the building owner while preventing building overheating through active control of light input to the interior.

A series of cross braces 52D, 52E, 52F, etc is used to build the panel frame similar to the method of assembly in FIG. 3A. Brace 52F is shown in FIG. 15 but omitted from FIG. 14. Beam 121 has an outside flange 122 and an inside flange 137 connected by a central web 127. A connector angle 124 and a bracket angle 125 branch off the central web near the outside flange. A connector angle 134 and a bracket angle 135 branch off the central web near the inside flange. A series of louvers 131 are suspended between a pair of pivot guides 138 and 138A The daylighting panel is installed in a commercial roof deck 142.

Periodic cooling holes 128 and 128A (FIG. 17), are drilled through web 127. Panels (FIG. 17) are fitted with plenum covers 48H, and 48J which fit over angles to form plenums 50F, and 50G. These plenums can be fed by an air distribution assembly of the type shown in FIGS. 5 and 10.

Louvers 131 each have an extruded shape consisting of an upper tube 131A, a reflective face 131B and a lower tube 131C. In the area of the pivot guides, face 131B is removed to form posts out of the tubes 131A and 131C. As seen in FIG. 15, guide 138 is a Z shaped extrusion with a pivot face 138C bending through the Z shape into an anchor ledge 126 that locks into the space between angle 125 and flange 122. A series of guide holes 138B serve as the mounting point for tubes 131A.

On one side of panel 141, a movable glide 132 is mounted between brace 52F and angle 135 in an inside channel 136. Channel 136 is formed by angle 135, web 127 and flange 137. A glide ledge 132D is contained but free to move along axis 140. Glide 132 has a toothed aperture 132B that engages a pinion shaft 129A from a stepper motor drive 129. Lower tubes 131C of the louvers can be positioned by a series of slots 132C cut into glide 132.

As shown in FIG. 14, the daylighting panel is assembled by taking the frame with installed louvers and louver adjusting system and attaching an outside glazing 120 and an interior glazing 130. An end plate 139 is inserted between the central webs of the beams and attached to the central webs and the braces.

Glazing 130 is thermoformed to create a left tab 130A and a right tab 130B that extend to an interior bend line 130C. A lower end tab 130D is bent at line 130C to cover the assembled end plate 139 and is adhesively bonded to it in the completed panel. Glazing 130 is formed around an inside bulb 133 carried on the inside flange of the angle I beam as illustrated with interior glazing 130E in FIG. 17.

Figure 17:
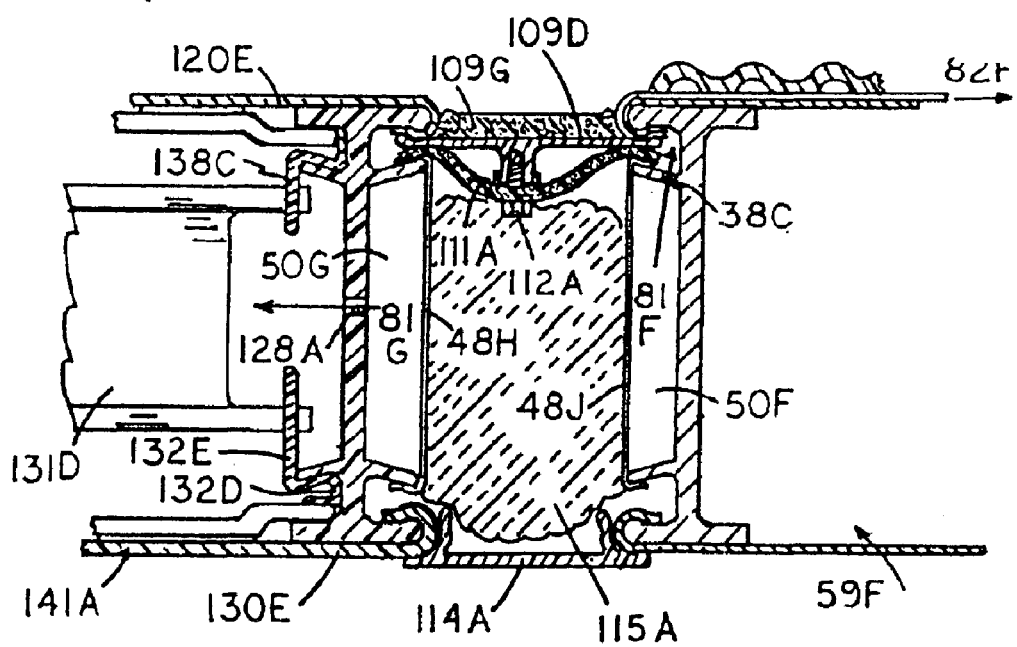
FIG. 17 is a cross section through a daylighting panel joint to a solar panel.

Glazing 120 is thermoformed to create a left side tab 120A and a right side tab 120B that extend to a bend line 120C. An end tab 120D is bent at line 120C to cover tab 130D and is adhesively bonded to it in the completed panel. Glazing 120E is then formed around the outside bulb (FIG. 17). A preferred material for both glazing 120 and glazing 130 is polycarbonate sheet stock between 1.5 and 8 mm thick. An alternative material is acrylic sheet of similar thickness.

Figure 16:
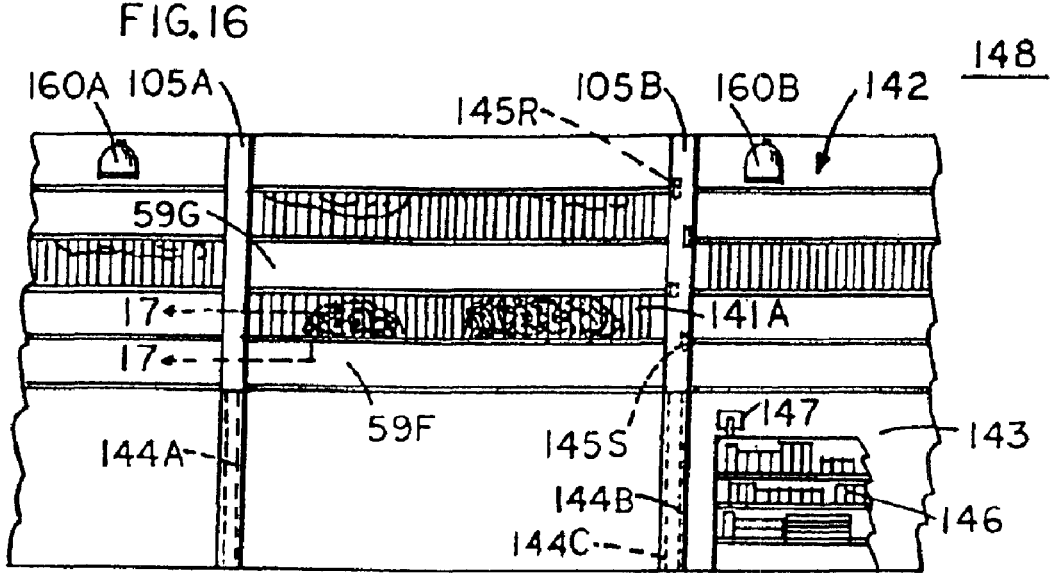
FIG. 16 is an interior elevation of a commercial building with daylighting and solar collection.
Figure 19:
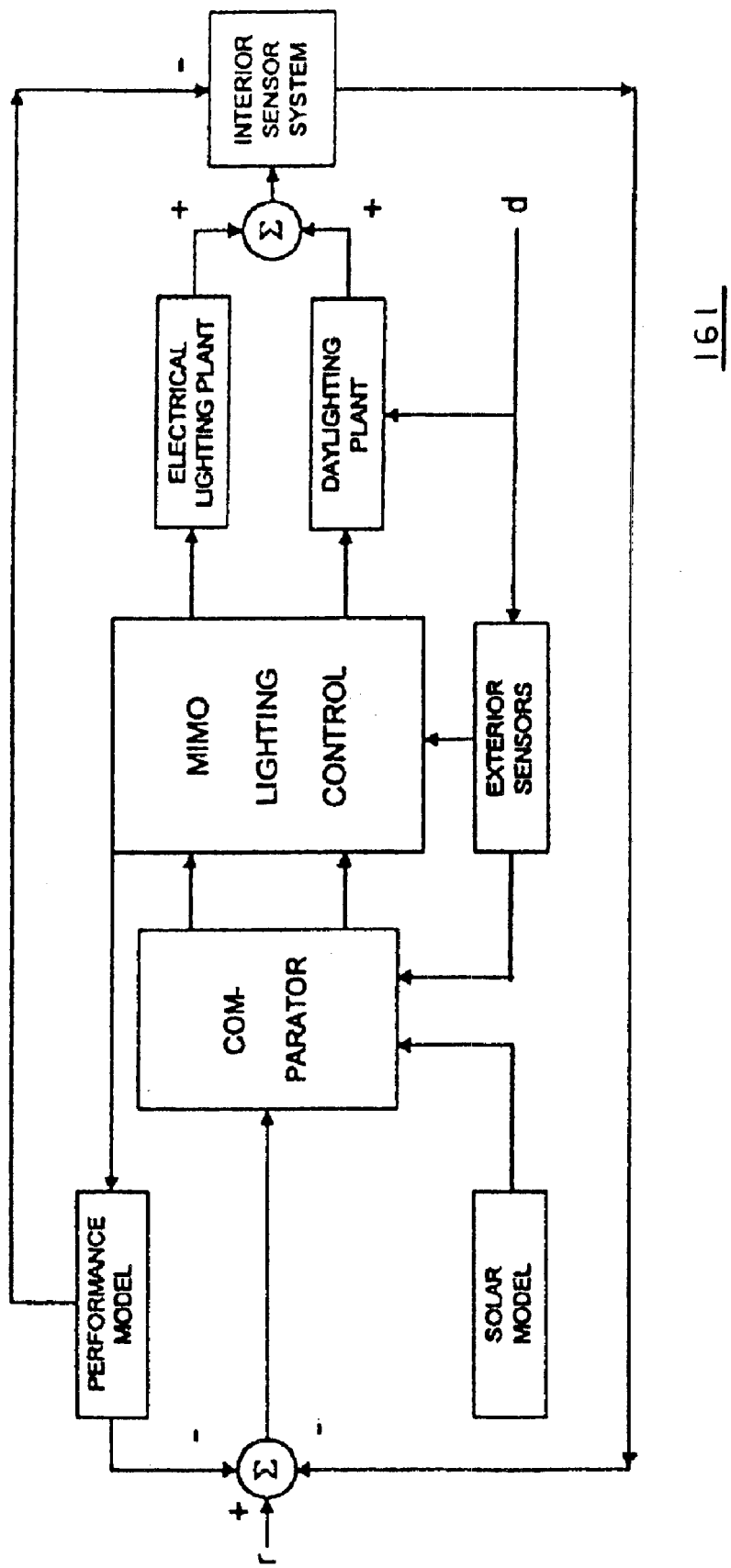
FIG. 19 is a block diagram of basic daylighting controls.
Figure 20:
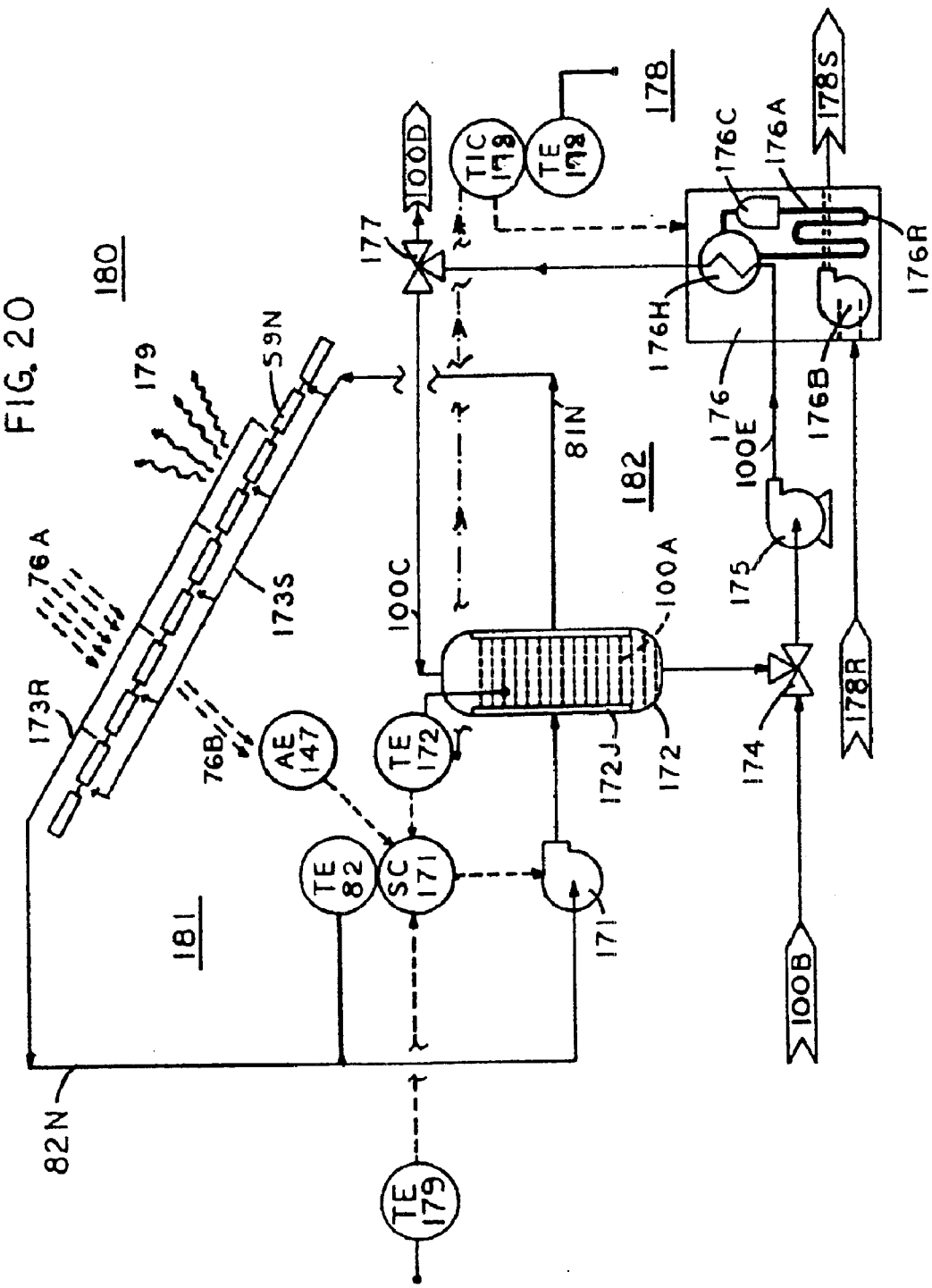
FIG. 20 is a process and instrument drawing of a demand side management system.
Figure 21:
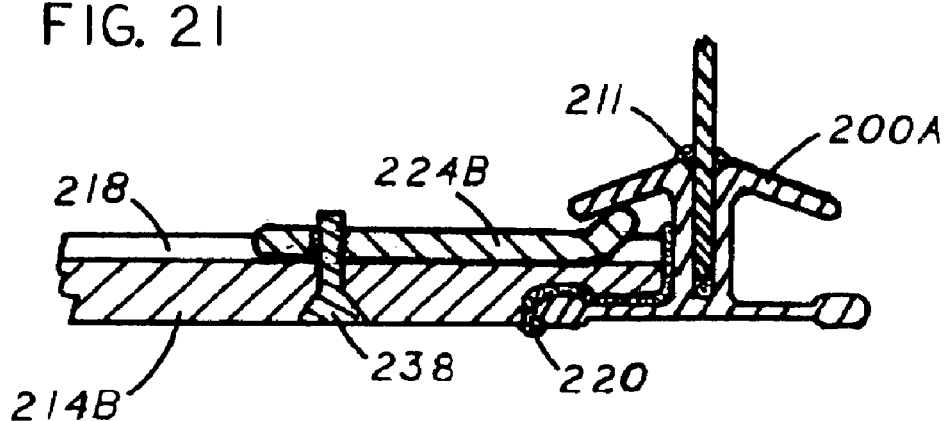
FIG. 21 is a section through a completed connection of FIG. 3B

FIG. 16 is an interior elevation of commercial roof deck 142 and commercial building 148. The roof deck contains solar panels such as 59F and 59G as well as daylighting panels such as 141A. Vertical wall 143 can be produced using either masonry construction or metal system methods. Windows and doors can also be included, (not shown). A merchandise display unit 146 is shown on the floor with an interior light sensor 147 mounted to it that can be used as part of the control system, (FIGS. 19–20).

Alternating air distribution assemblies such as 145S and 1 45R feed air to the panels and return it to the energy management system. Duct covers 105A and 105B conceal ducts 144A, 144B and 144C which in turn connect to the air distribution assemblies.

In FIG. 17, plenum 50F in solar panel 59F is formed by cover 48J assembled over the upper angle and the lower angle of the angle I beam. In the assembled construction as shown, insulation batt 115A fills the space between the two panels. Exterior bracket 109D with exterior bracket seal 109G provide the weather strip seal between the panels in the completed joint formed using flex connector 111A and screw 112A. The interior trim is provided by an inside strip 114A.

Figure 18:
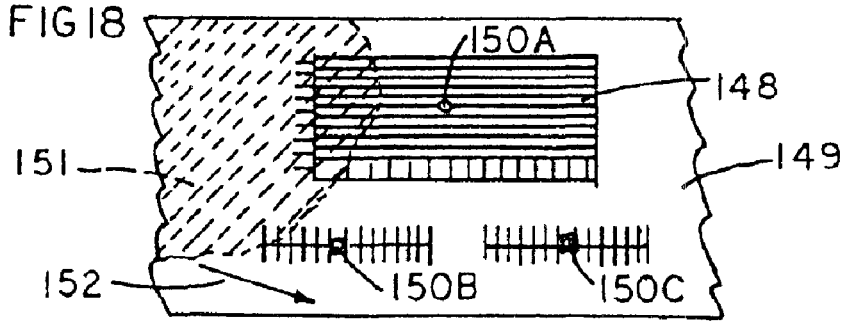
FIG. 18 is a plan view of a commercial building site.

FIG. 18 is a plan view of building 148 located on a parking lot site 149. An exterior sensor 150A is mounted at the peak of the roof. Two other exterior sensors 150B and 150C are mounted atop light posts in the parking area.

Shadow 151 denotes the position of a cloud. The motion of shadow 151 is indicated by arrow 152 and can be tracked by the exterior sensors which feed information to a lighting control system 161 (FIG. 19).

Operation—FIGS. 14 Through 18

FIGS. 15 and 17 show the operation of the daylighting panels in roof deck 142. A connection between daylighting panel 141A and solar panel 59F is detailed in FIG. 17. The same air distribution system that allows for solar collection enables removal of excess heat from the daylighting panels.

Holes 128 and 128A meter and distribute air flow 81G from the plenum into the interior of the daylighting panel. Air flow 81F through manifold holes 38C in solar panel 59F is heated in the capillary film to become warm air flow 82F.

Movable glides 132 and 132E are driven by stepper motors 129 to arrive at proper positioning for lighting control. The louvers have a diffusely reflective surface that will scatter light back towards the exterior as they are closed down by moving the angle between the louvers and the centerline of the angle I beam away from 90 degrees and toward 180 degrees.

Ledge 132D is secured by and moves between bracket angle 135 and periodic cross braces such as 52F along axis 140. In simpler and lower cost panels that might be used for greenhouses, stepper motors 129 could be replaced by alternative gearboxes 119, (FIG. 14), to position the louvers manually using a hand crank with a hook (not shown).

It is anticipated that between 4 and 15% of the area of roof deck 142 should have daylighting panels installed to satisfy lighting needs of the commercial building. As the dynamic range of natural light available is quite large, the need for significant light damping by the louvers occurs on brighter days. Heat dissipation can be accomplished through air flows such as 81G through the daylighting panels. This heat capture can be used elsewhere in a DSM energy system, (e.g. as in FIG. 20).

During evening hours, louvers 131 can be substantially closed against one another to limit heat transfer by convection. Louvers 131 are preferably produced from foamed, extruded fire retardant thermoplastics further aiding night insulation. Alternatively, they can be made from forest products. At night, the diffuse reflectance of the louvers will aid in keeping artificial light in the building and cutting costs. Based on the model of a 465 m², (5000 square foot), building in Boston, monthly daylighting savings from the invention estimated at $240 are obtained over the heating season.

The present invention affords a practical, easy to use system for incorporating daylighting panels into a roof deck, for dealing with heat buildup and loss, and providing a modern actuator system for daylighting control, (see FIG. 19.) The daylighting panels can also be utilized in a variety of structures that include but are not limited to: greenhouses, solariums, porch additions, and transit stops.

Periodic cooling holes such as hole 128 cut through the web of the angle I beams permit internal heat exchange flows through panels. Optional holes 239 shown in FIG. 3B, cut through the dovetail channels can also be utilized in this manner, but would feed a flow of air to the inside surface of skin 60 on a structural panel. It is not desired to limit the applicability of internal panel heat exchange to only daylighting panels. Flows to the interior of panels from the plenums formed from angle I beams can provide heat exchange capability to a variety of applications: These include but are not limited to panels for heat storage tanks (FIGS. 20 and 23), solar photovoltaic panels, (FIGS. 22, 23) solar thermal panels without Argon insulation, and heated commodity storage tanks (not shown).

Lighting Control System—FIG. 19

FIG. 19 illustrates an additional embodiment of the invention in the form of lighting control system 161. System 161 is represented by a block diagram for control. Operation of daylighting and artificial lighting in the commercial building is most efficiently implemented through the use of a modern computerized control system. (Text has been used in the figure to represent components in a standard block diagram)

A daylighting plant consisting of daylighting panels 141, stepper motors 129 and motor drivers (not shown) modulates the ambient exterior light, disturbance d, consisting of sunlight 76 and shadow 151. Exterior sensors such as 150A, 150B, and 150C monitor the exterior light level and the speed, direction and frequency of cloud motion at the site. Data from the exterior sensors is fed to a multiple input, multiple output MIMO lighting control and to a comparator module.

An interior sensor system consists of an array of interior light sensors 147 and signal conditioning and processing elements, (not shown). The total light from the daylighting plant and an electrical lighting plant is averaged by the interior sensor system. The electrical lighting plant consists of luminaires such as 160A, and 160B, (FIG. 16) lamp power supplies, wiring, and fusing/disconnects, (not shown).

The projected output of the electrical lighting plant is estimated by an electrical lighting performance model. The performance model will take the output of the MIMO lighting control to the electrical lighting plant and introduce delays due to actuation times and decline in luminaire performance over time due to bulb efficiency drops to arrive at the present projected output of the electrical lighting plant.

The projected output of the electrical lighting plant is subtracted from the total interior light detected by the interior sensor system to arrive at a feedback signal for daylighting contribution to the interior lighting. Both the projected output and the feedback signal are subtracted from a setpoint lighting reference, r, to provide a control error signal to the comparator. In the winter heating season, setpoint r can be adjusted upwards to allow for passive solar heating of the building by the daylighting plant.

The comparator module receives an error signal, data from exterior sensors, and data from a solar model. The solar model provides time based information relating to theoretical sunlight intensity, historic cloudiness, and projections for short term exterior light insolation based on up to date weather information. The comparator module provides two outputs to the MIMO lighting control, one representing the daylighting setpoint and another representing an electrical lighting setpoint. One preferred form for the comparator module is a fuzzy logic software system.

The MIMO lighting control has inputs from the exterior sensors, and the comparator. It has outputs to the electrical lighting plant, the daylighting plant, and the performance model. A preferred form for the MIMO lighting control is an adaptive control system that attempts to minimize electrical lighting plant control action and maximize energy savings through use of a cost function. Minimizing control action can prolong the life of costly high efficiency bulbs in an optimized system.

The daylighting control system provides a convenient means to maintain a desired lighting level in a commercial or light industrial building. It allows for a smooth daylighting environment and excellent cost savings when used with high efficiency electrical lighting.

Demand Side Management System—FIG. 20

FIG. 20 illustrates a preferred embodiment of the invention in the form of demand side management, (DSM) system

180. FIG. 20 is a process and instrument, (P&ID), drawing, showing the integration of air distribution, (FIG. 10), thermal storage, daylighting, solar and insulating panels into the DSM system for conservation of costs and resources in a building 178. The DSM system can be used in both a heating mode of operation and a cooling mode of operation and allows for significant energy and cost savings over conventional metal buildings. (A standard convention in P&ID drawings is to show local controls as circles with a tag identifying component type, e.g. TE 172 is read as temperature element 172)

The DSM system has two process loops. An energy exchange loop 181 circulates air through a collector array 59N and a heat transfer jacket 172J on a thermal storage tank 172 by means of a collector blower 171. An hvac loop 182 uses a pump 175 to circulate water through a water source heat pump 176 which provides space heating and cooling for the building.

The collector blower is preferably a variable speed unit controlled by a speed controller SC171. The speed controller functions to maintain a desired temperature in a process air flow 82N returning from collector array 59N to the suction side of the collector blower. A thermocouple TE82 immersed in process air flow 82N supplies a temperature input to speed controller SC171.

Thermal storage tank 172 is filled with water 100A which is in contact with jacket 172J. Process air flow 82N from the discharge of blower 171 is passes through jacket 172J and is conditioned by water 100A. It then becomes supply air flow 81N. This flow is fed to the collector array through a roof deck supply manifold 173S. In the heating mode of the system, supply air flow 81N is heated by solar insolation 76A. A roof deck return system 173R, moves air flow 82N back to blower 171. Both manifolds 173R and 173S are made up of the air distribution components shown in FIGS. 5,10,11,12,13,17 and 18. Loop 181 is ideally designed to store heating and cooling capacity for periods of time on the order of hours or days, rather than weeks or months.

Thermal storage tank 172 is shown schematically in FIG. 20. Tank 172 can be a conventional rolled steel tank with a welded or mechanically attached heat transfer jacket 172J. Alternatively, it can be produced by assembly of modular heat exchange panels (see FIGS. 22, 23), attached as sides in a multisided cylinder, according to the present invention and/or U.S. Pat. No. 5,134,827.

A preferred method for building modular panels for storage tank 172 would utilize beam 200 of FIG. 1B, and the assembly of FIG. 3B including optional through holes 239. Supply of air to the inside of the skins is discussed in 'Operation' FIGS. 14 through 18. The modular panels would be fabricated and connected similarly to FIGS. 1B, 3B, 5, 7, 8, and 10–13 with the exception that the capillary films, insulating films, and connection to the building frame would be omitted. Interior air flow would occur between skin 60 and facing 63, supplied and returned to loop 181 through holes 239.

In the cooling mode of system 180 (FIG. 20), supply air flow 81N is cooled by radiant and convective heat losses 179. Cooled process air flow 82N returns from the collector array by means of manifold 173R. Night sky cooling of this sort has been recognized as having a great potential in dry climates such as California and those found in other semiarid areas. System 180 has the capability to use off-peak priced electricity and potentially use ice storage systems (not shown) to cool smaller commercial buildings that have not been served by this capability.

Water 100A from thermal storage tank 172 or an alternate water source 100B is selected by positioning of a suction side three way valve 174 as the feed stream to pump 175. Control of a discharge three way valve 177 is slaved to the positioning of valve 174. When water 100A is the feed to pump 175, valve 177 is positioned to a return water flow 100C. When water flow 100B is the feed to pump 175, valve 177 is positioned to an alternate return water flow 100D

A rough schematic of heat pump 176 has been provided to show the operation of hvac loop 182. It does not include reversing valves and many other detailed components and controls specific to any particular manufacturer of heat pumps of this nature. Heat pump 176 takes a building return air flow 178R, heats or cools it using an air handling coil 176A, and a heat pump blower 176B to produce a building supply air flow 178S.

A water discharge flow 100E of pump 175 passes through one side of a liquid heat exchanger 176H while a refrigerant flow 176R from a compressor 176C passes through the other side of exchanger 176H, and coil 176A. Although the figure shows the water flow through the tube side of exchanger 176H, it is not desired to limit the invention to a particular exchanger piping arrangement. In the heating mode of hvac loop 182, the water is the heat source for heat pump 176. In the cooling mode of the hvac loop, the water is the heat sink for the heat pump.

The temperature of the building is measured by temperature element TE178 and controlled using temperature indicating controller TIC178. The preferred form of temperature indicating controller TIC178 from an operational cost standpoint is a computer control system. Alternatively, the temperature indicating controller can be a simple thermostat controller.

Controller 178 can optionally receive data (dash dot line) from TE172, as a means of actuating valves 174 and 177 to change the water source for heat pump 176. (control linkages not shown) Optional inputs to the speed controller are a signal from a tank temperature element TE172, an exterior temperature element TE179 and a light sensor AE147 measuring a light level 76B. Operation of energy exchange loop 181 can thus be optimized for maximum efficiency of operation and coordination with the demand generated by the hvac loop and lighting control system 161.

The choice of alternate water source 100B would be made by the design group for the building from a variety of options that include but are not limited to; a ground water source, a closed loop ground circulation system, a natural gas, fuel oil or propane heated water tank, a cooling tower or other evaporative cooler loop, an electrically heated water tank, a process heat recovery loop, a surface water source, a wind driven fluid friction heat source, a water loop heated by a fire, a water loop cooled by a wind system as the prime mover, or a ventilation heat recovery loop, (not shown)

DSM system 180 also affords the opportunity to utilize the capability of insulating panels 58 and solar panels 59 to cut building cooling costs through the use of radiation losses to the night sky/convection losses to the ambient air 179. Prior art systems often accomplish this objective through the use of costly and corrosive adsorbent chemicals. Most areas with abundant solar resources require cooling capabilities. Off peak time electrical usage and the capability to add modules to the basic P&ID of FIG. 20 for ice storage are additional advantages of the DSM system.

Figure 22:
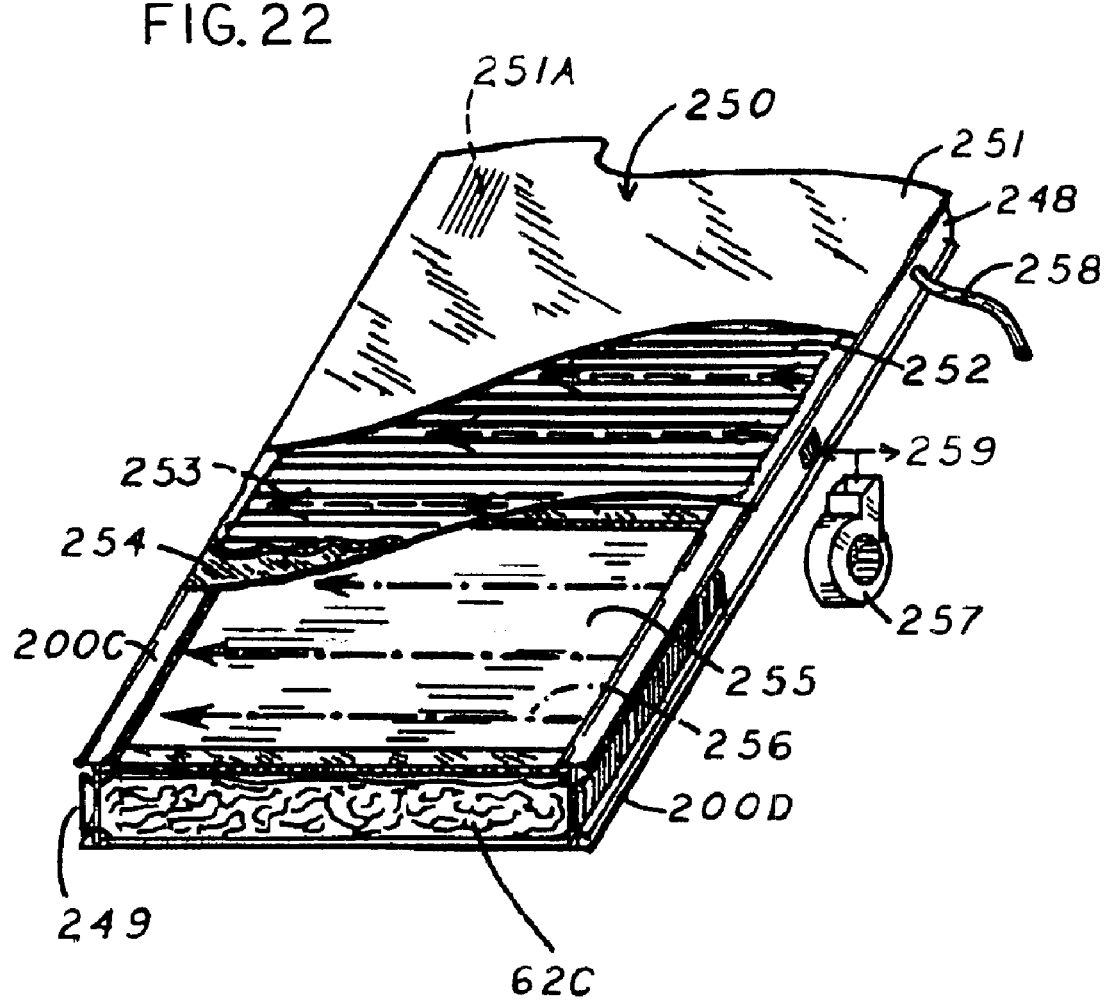
FIG. 22 is an isometric cut away drawing of a photovoltaic panel

Description And Operation FIGS. 22 and 23

FIG. 22 shows a preferred embodiment of the invention in the form of a photovoltaic, (PV), panel 250. Its use within a distributed electrical power system 260 is shown in FIG. 23, which also shows a modular thermal storage tank 262 made up of similar panels. The PV panel and the power system make up a practical approach to lowering first costs and providing improved distributed electrical generation for sites in developing countries and those in developed countries that would benefit from this capability.

The side frames of PV panel 250 are made up of angle I beams 200C and 200D, identical to beam 200 shown in FIG. 1B. Bracing and general construction of the panel frame has been detailed in FIGS. 2A through 6 and FIG. 21. Panel 250 uses optional holes 239 (FIG. 3B) through the beams to provide a path from the dovetail shaped channels into the interior of the panel. Panel 250 also utilizes manifold holes 38 through the angles to provide a path for flow between the plenum (not numbered, formed by a plenum cover 248 and beam 200D) and the upper dovetail shaped channels 207 (FIGS. 1A, 1B). An auxiliary blower 257 is used to supply a high air flow 259 to the plenum through an aperture (not numbered) in cover 248. Blower 257 and flow 259 also supply an adjacent panel (not shown) in a PV panel array 250N (FIG. 23).

An outer skin 254 and an inner skin (not numbered) are attached to panel 250 as described in FIGS. 3A and 5. A photocell array 252 covers and is attached to skin 254 and is connected and wired as known to the art to provide electric power to an output cord 258. Cord 258 can be routed and spliced in the joint spaces (not numbered) between panels in panel array 250N to feed to a PV electrical power output 265 (FIG. 23). Panel 250 has a cover film 251 which is similar to films 80A, 80B, and 90 (FIGS. 5 and 6) and wraps into the upper channels 207 of beams 200C and 200D. Film 251 has a custom pattern of risers (not shown) similar to risers 90B that is suited to direct air flow past the outside surface (shown) of photocell array 252 and is bonded to array 252 and skin 254 in the assembled panel. Film 251 is preferably made from polyvinylidene fluoride or another high temperature, transparent thermoplastic. Optionally, a surface texture 251A can be provided to enhance light absorption from a particular direction or emissivity for cooling requirements.

Flow 259 is divided within upper channel 207 of beam 200D into two flows. A first air flow 253 (dashed arrows) passes between film 251 and array 252 and removes heat from the outside surface of the photocell array. A second air flow 256 (dash-dot arrows) passes between an insulation facing 255 and the back of skin 254 removing heat from the back of the photocell array. Flows 253 and 256 re-combine in upper channel 207 of beam 200C and move into a plenum 249 through manifold holes 38 provided in beam 200C. The air distribution assembly 145 shown in FIG. 10 can be taken as representative of the arrangement for the PV panels. Heated air is then ducted as shown in FIG. 23.

The two sided cooling of panels 250 allows use with concentrating collectors such as those shown in FIG. 23 and the capability to operate photocell arrays 252 at acceptable temperatures with magnified solar input and power output 265. Typically, more than 80% of solar input to photovoltaic materials turns into heat which must be eliminated.

An alternate embodiment of the invention is shown in storage tank 262 (FIG. 23). Tank 262 is made up of a number of heat exchange panels 262A joined to one another at the interior of the tank in a manner similar to that shown in FIGS. 11 to 17 and/or provided by in U.S. Pat. No. 5,134,827. Panels 262A are assembled as staves of a barrel and can provide a variety of diameters and heights for tank 262 using the same basic panel design. Panels 262A are anchored using conventional fasteners (not shown) to a tank base and bottom for the tank (not numbered) which provide for insulation from grade and sealing at the bottom of the multi-sided cylinder.

A set of outer brackets 262B engage channels 207 nearest the viewer in FIG. 23. Brackets 262B are designed specifically for the application and can utilize components similar to those shown in FIGS. 1B, 2B, 3B, 21 and/or 7, 8 to engage channels 207, lock panels 262A in fixed position relative to one another and resist the outward hydrostatic force of a thermal storage liquid 262C contained in the tank.

Panels 262A have the same basic structure as panel 250, with the exception that film 251 and photocell array 252 are omitted in the construction. Auxilliary blower 257 might be optionally used depending on particular design requirements. Air flow 256 will exchange heat with the thermal storage liquid in the tank through skin 254. The tank could also be used as shown in FIG. 20 to provide a heat sink or source to heat pump 176. It is expected that tank 262 and variations of it, could be used in a variety of applications such as, (but not limited to); storage of heat in greenhouses, non-photovoltaic solar collector systems, waste heat recapture from buildings and processes, heating I storage of temperature sensitive materials like corn syrup/heavy greases, solar 'combisystem' stratified tanks that are widely used in Europe for space heating and hot water supply, and systems using a thermal electric generator 268 for night electrical supply such as that shown in FIG. 23. The modular assembly from panels allows use in areas where transportation/installation of a large tank within a structure would be difficult.

With and without the skin layers, the framework demonstrated by tank 262 can also potentially be utilized for a number of tower like and column structures (not shown) having purely mechanical functions. This would also include panels that were somewhat narrower at the top than bottom, (using variable length cross members) to produce tapered towers or columns. Both tank 262 and possible towers and columns can be erected using a central gin pole to raise the individual panels up like flower petals, then securing them to each other and additional components, (not shown).

FIG. 23 is a process flow diagram showing an alternate embodiment of the invention in the form of distributed electrical power system 260. The power system affords new opportunities for reducing the cost of photovoltaic electricity and providing night electricity without the use of battery storage system (not shown) or draw from an external electrical distribution grid, ('GRID').

Panels 250 are shown arranged in panel array 250N which could take the form of a building roof such as that shown in FIG. 4. Connections between panels and the building frame would be provided as shown in FIGS. 4 through 17. A blower 263, a roof deck supply system 264S and a return system 264R circulate a flow of air (indicated by heavy solid lines) between the PV panels making up the roof deck and the jacket side of tank panels 262A, (air flow 256 FIG. 22). During the day, thermal energy is stored in tank 262 and removed from panel array 250N. Systems 264S and 264R include the components such as those shown in FIG. 10, blowers 257, and other transfer ducting as necessary.

A tracking heliostat field 261 is positioned apart from array 250N. Field 261 focuses and concentrates sunlight 76D into an intensified light stream 76C (dash—dot arrows) striking the array. Concentration factors of 2 to 6 times the intensity of the sunlight will reduce the basic cost of power 265 by a nearly equal factor, as photocell arrays 252 make up one of the highest cost components of system 260, or any other photovoltaic system. Power 265 is suitably transformed and conditioned through panel 266 which outputs electricity (dashed lines) to a site power distribution panel, ('DISTRIBUTION').

During periods of low direct sunlight or at night, power can be provided from thermal electric generator (TEG) 268. The TEG is shown schematically as a transformer and typically can transform temperature differential into DC electricity at an efficiency of 2.0 to 3.5% and a cost of about $1/watt. The level of thermal storage fluid 262C in tank 262 is indicated by the dashed line near the top of the tank. Warmer fluid is drawn from a suction point (not numbered) near the tank top into a line 270 to the suction side of a circulation pump 267. It runs through a channel in the TEG (not numbered), is cooled by the action of the TEG and returns to a return head (not numbered) at the bottom of tank 262 via a second line 271. Another circulation pump 273 supplies fluid from a cool reservoir 274 to generate the temperature differential required to operate the TEG. An output of electrical power 275 from the TEG is suitably transformed and conditioned through a panel 272 and supplied to DISTRIBUTION. The site power distribution panel supplies electrical power, (dashed line) to a system load (LOAD). Occasionally the distribution panel may need to import power from the external distribution grid.

Fluid 262C is ideally water for maximum thermal storage capacity. Oil heated to a higher temperature is an alternative. Options for the make up of reservoir 274 include but are not limited to; a groundwater loop, a surface water source, a cooling tower system, a 'desert cooler', a second tank of type 262 that vents heat to the night sky through array 250N, a loop cooled by a finned tube radiator working against night air, and a rainwater cistern.

Although array 250N is described here as a building roof deck, it additionally can take the form of a wall, or other options including but not limited to; a free-standing space frame, or a structure covering and supported by a hill side or other natural or man-made geographic feature. LOAD can encompass a variety of electrical demands ranging from the needs of the building it is in to a group of nearby buildings and homes, to a village or district of a city, or an industrial/agricultural operation. Distributed electrical power system 260 advances distributed or remote power systems by improving the cost effectiveness of photocell arrays 252, and providing for low cost thermal electric power generation that can be utilized in periods of low direct solar lighting or night conditions with minimal 'back up' supply.

Conclusions, Ramifications and Scope

My invention provides for DSM building energy systems with low installation and operating costs by using a single building mechanical system for space heating and cooling that utilizes both renewable and conventional energy sources. Demand side management energy savings from improved insulation, daylighting, space heating, and cooling on the order of 187 petajoules, (177 or trillion Btu), in year 12 and 326 petajoules, (309 trillion Btu), in year 20 are possible with the system, with reduced pollutant releases.

The heat produced by the solar panels and stored in tanks 172 or 262 can be used in conjunction with commercially available TEG's as seen in FIG. 23, to provide electrical power for lighting, refrigeration equipment, charging of electric vehicles, and other applications. Another potential use of the heat would be to produce power through the vaporization of a low boiling point working fluid and expansion through a turbine, (not shown). The stack draft generated by the solar panels and air distribution assembly can be the source of a variety of ventilation applications, particularly for agricultural buildings.

Beyond operating cost savings, system 180 offers attractive incentives to both the commercial building owner and the building contractor in the form of higher profitability. It affords the users of the building a more pleasant working and shopping environment through the use of daylighting systems.

The fire safety features and material compositions of the invention allow for an improved building that resists flashover for a longer period of time by releasing heat from the building. The capability to show the location of a fire inside the building and facilitate fire fighting efforts is an important pair of tools in reducing building damage and loss of life in metal building fires. While not mentioned in the specifications, the heat exchange capability of the roof deck and the energy storage system shown in FIG. 20 could be used to resist the ignition of a roof deck from a nearby forest fire.

By providing a secure structural connection to the building frame and a continuous mechanical joint between panels, the invention improves on the purlin and self-drilling screw methods that cause many problems in conventional metal buildings. Other features such as improved resistance to racking motion of the roof deck in an earthquake might emerge through use of the invention.

Connector components 224, 214, 91 and 92 provide a new class of methods for attaching component of various types, (particularly components made from composite materials) without placing conventional fasteners through a joint. These connection systems can be utilized with and without the angle I beams as they are shown with in the specifications. These are seen to have potential in areas such as aerospace, transportation, electronics and a host of applications beyond the building structures cited in the application. One example would be the attachment of composite skin materials to aircraft frames.

The PV panels and distributed power system of FIGS. 22 and 23 can make important in roads to supply energy in developing countries and countries that are emerging economically. It can also contribute significantly to reduction of demand in the US and other developed countries. The supply of reliable green power to business operations that cannot tolerate supply interruptions is another application.

Thus, the scope of the invention should be determined by the claims and their legal equivalents, rather than limited by the examples given in the specifications.

I claim:

1. A structural beam elongated in a first direction and transverse to said direction of elongation comprising; two flanges joined by a web, said web being substantially perpendicular to said flanges and joining said flanges roughly at a central point, and at least two angle sections, each said angle section connected to said web near one of said flanges and forming an acute angle with the portion of said web closest to said near flange, said near flange and each of said at least two angle sections forming a roughly dovetail shaped channel with an aperture opening into an interior cavity, said dovetail shaped channel having a seal surface on one side, a lock surface roughly opposed to said seal surface on the other side and having a bottom section facing said aperture and connecting said seal surface with said lock surface;

whereby, a number of larger structures with integral connection to said structural beams with a variety of energy saving features can be constructed.

2. The structural beam of claim 1, further including bulb enlargements at the edges of said flanges.

3. The structural beam of claim 1, wherein said near flange, said bottom section(s) and said angle section(s)

comprise a flange module composed a first material and said web is composed of a second material, further including, module attachment means for securing said flange module to said web.

4. The structural beam of claim 3, wherein said first material comprises an aluminum extrusion and said second material comprises a composite having fibrous reinforcement bonded within a resin matrix; whereby, the exterior of a structure can be thermally isolated from the interior.

5. The structural beam of claim 1, wherein said structural beam has four angle sections.

6. The an openwork frame comprising two of said structural beams of claim 1 that make up a pair of spaced apart, side rails, said openwork frame further including; a plurality of cross members spanning said side rails and attachment means for securing said cross members to said pair of side rails, said openwork frame having a first plane roughly delineated by a first pair of flanges, one from each of said side rails, and those cross members joining said first pair of flanges, and having a second plane roughly delineated by the remaining pair of flanges, one from each of said side rails, and those cross members joining said remaining pair of flanges.

7. The a panel comprising the openwork frame of claim 6, further including an exterior skin attached to said first plane and an interior skin attached to said second plane, said exterior skin and said interior skin comprising relatively thin sheet materials having two roughly parallel surfaces, said exterior skin being attached to said first plane on a frame surface and having an exterior surface on the opposite side said exterior skin being formed around the ends of said first pair of flanges and attached to said seal surfaces of said dovetail shaped channels, said interior skin being formed around the ends of said remaining pair of flanges and attached to said seal surfaces of said dovetail shaped channels, and additionally including end caps and end sealing means affixed to the ends of said frame, and other appropriate panel sealing means, said openwork frame, said exterior skin, said interior skin, said end caps, said end sealing means and said panel sealing means comprising a building panel and enclosing an interior cavity.

8. The panel of claim 7, wherein said exterior skin and said interior skin are composed of thin gauge metal, and further including insulating means filling said interior cavity, said building panel and said insulating means comprising an insulating panel.

9. The panel of claim 8, wherein said insulating means comprise; a fibrous fire retardant thermal insulation material and a gas having a thermal conductivity lower than that of air;

whereby, improved insulating features and fire safety can be achieved without using polymer foams.

10. The panel of claim 8, wherein just two of said at least two angle sections on each of said pair of side rails are situated on the same side of said web and outside of said interior cavity, and wherein, said just two angle sections form two of said dovetail shaped channels, with the dovetail shaped channel closest to said first plane being designated as a seal channel and the dovetail shaped channel closest to said second plane being designated as a structural channel.

11. The panel of claim 10, said insulating panel further including;

a plenum cover affixed to and spanning said just two angle sections on each of said pair of side rails and forming a plenum between said plenum cover, said web and said just two angle sections, with a first plenum being designated as a supply plenum and a second plenum being designated as a return plenum, fluid transfer means to connect said supply plenum with said return plenum and to contain a heat transfer fluid, and fluid displacement means for supplying said heat transfer fluid to said supply plenum, for causing said heat transfer fluid to flow between said supply plenum and said return plenum, through said fluid transfer means, and for removing said heat transfer fluid from said return plenum, said insulating panel, said plenum covers, said supply plenum, said return plenum, said fluid transfer means, said heat transfer fluid, and said fluid displacement means comprising a heat transfer panel;

whereby said heat transfer fluid can be used to effectively collect energy from or dissipate energy to; the immediate environment of said heat transfer panel.

12. The panel of claim 11, wherein;

said insulating means comprise; fire retardant thermal insulation, an insulation facing bonded to said thermal insulation on the side nearest said frame surface, and a roughly planar space between said insulation facing and said frame surface, and wherein;

said fluid transfer means comprise; said planar space, a series of manifold holes passing through those angle sections forming said seal channels, said seal channels, closure means for sealing said apertures of said seal channels, and a series of through holes through said bottom sections and said webs of said seal channels;

whereby, said heat transfer fluid can exchange heat transmitted through said exterior skin by convective heat transfer with said frame surface.

13. A thermal storage tank comprising, a plurality of said heat transfer panels of claim 12 forming said thermal storage tank in the form of a multi-sided cylinder, said exterior skins of said heat transfer panels forming most of the perimeter of a fluid containment space, said thermal storage tank further including;

tank support means for providing a base and a bottom for said thermal storage tank, sealing means for mechanically engaging said seal channels, providing said closure means and completing a liquid tight seal between said seal channels, tank base anchorage means securing and sealing said panels against said tank support means, a thermal storage media contained within said fluid containment space and bounded by said exterior skins, said tank support means and said sealing means, and bracket means for engaging said structural channels, maintaining a fixed spacing between said heat transfer panels and resisting an outward force caused by said thermal storage media;

whereby, said thermal storage tank can serve to condition said thermal storage media at one point in time using said heat transfer fluid and serve at a later point in time as a thermal energy reservoir.

14. The panel of claim 12, further including;
a photocell array covering at least part of said exterior surface, and electrical connection means for collecting an electrical output from said photocell array, and connecting said electrical output to an output device, and wherein;
said fluid transfer means further includes; a capillary film covering said photocell array and said exterior surface, with said capillary film further extending into said seal channels,
said capillary film having riser means for bonding to said exterior surface and said photocell array in a distributed pattern and maintaining a fluid transfer channel between said capillary film and said photocell array in areas where said riser means are not bonded,
said heat transfer panel, said photocell array, said electrical connection means, said output device, said capillary film, said riser means, and said fluid transfer channel comprising a photovoltaic panel;
whereby, concentrated sunlight impinging on said photovoltaic panel can generate electricity and said fluid displacement means can remove excess heat, preventing damage to said photocell array.

15. The panel of claim 7, wherein said exterior and interior skins are composed of light transmitting materials, and wherein;
just two of said at least two angle sections on each of said pair of side rails are situated on the same side of said web and outside of said interior cavity,
said building panel further including;
a plenum cover affixed to and spanning said just two angle sections on each of said pair of side rails and forming a fluid plenum between said plenum cover, said web and said just two angle sections,
with a first plenum being designated as a supply plenum and a second plenum being designated as a return plenum,
fluid transfer means to connect said supply plenum with said return plenum, to contain a heat transfer fluid, and to remove heat from said interior cavity, and
fluid displacement means for supplying said heat transfer fluid to said supply plenum, for causing said heat transfer fluid to flow between said supply plenum and said return plenum, through said fluid transfer means, and for removing said heat transfer fluid from said return plenum,
said building panel, said plenum covers, said supply plenum, said fluid transfer means, said return plenum and said fluid displacement means comprising; a daylighting panel;
whereby, ambient natural light can be transmitted through said daylighting panel to illuminate the interior of a structure and heat formed from attenuated light can be removed from said daylighting panel by said heat transfer fluid.

16. The panel of claim 15, wherein each of said pair of side rails has four angle sections, said angle sections situated within said interior cavity being designated bracket angles,
further including adjustable light attenuation means for setting a desired light transmission level through said daylighting panel, said light attenuation means mounted to said bracket angles, and actuator control means for adjusting said light attenuation means based on a control signal.

17. The panel of claim 16, wherein a multiplicity of said daylighting panels make up at least part of the sheathing of a building structure, and
said multiplicity of daylighting panels comprise a lighting control system,
said lighting control system further including; exterior sensor means for analyzing ambient light conditions at the outside of said building structure, and for providing outputs to other parts of said lighting control system,
electrical lighting plant means for energizing and controlling luminaires that provide artificial lighting within said building structure,
interior sensor means, for analyzing interior light levels within said building structure, and supplying a feedback signal to a lighting controller, and
said lighting controller having calculational means to 1) compare the outputs of said exterior sensor means with a solar model for the site that includes predicted weather conditions, 2) control said interior light levels to a desired lighting setpoint supplied by a human operator, 3) provide an output signal for actuation by said electrical lighting plant, 4) provide said control signal to said actuator control means of said multiplicity of daylighting panels through a daylighting plant, and 5) minimize electrical usage for said artificial lighting within said building structure.

18. The panel of claim 11, wherein said exterior surface has a light absorbing color, and
said insulating means comprise a fibrous fire retardant thermal insulation material and a gas having a thermal conductivity lower than air, and
wherein said fluid transfer means comprise; a capillary film covering said exterior surface,
said capillary film having riser means for bonding to said exterior surface in a distributed pattern and for maintaining a fluid pathway between said capillary film and said exterior surface in areas where said riser means are not bonded,
said fluid transfer means further including, piping means for connecting said supply plenum and said return plenum to said fluid pathway,
said heat transfer panel, said insulation material, said gas, said capillary film, said riser means, said fluid pathway and said piping means comprising a solar panel,
said solar panel being capable of operation in a heating mode and a cooling mode,
whereby, in said heating mode, light absorbed by said exterior surface and said capillary film can be captured as useful energy by said heat transfer fluid, and whereby heat contained in said heat transfer fluid can be dissipated through said capillary film in said cooling mode.

19. The openwork frame of claim 6, wherein at least two of said openwork frames make up a structural column,
said structural column further including; a first connector means for engaging said at least two openwork frames at said first pair of flanges and securing said at least two openwork frames one to another,
a second connector means for engaging said at least two openwork frames at said remaining pair of flanges, and securing said openwork frames one to another, and
end attachment means for securing the ends of said structural column to a set of components making up a larger assembly.

20. The panel of claim 7, wherein just two of said at least two angle sections on each of said pair of side rails are situated on the same side of said web and outside of said interior cavity, and wherein, said just two angle sections form two of said dovetail shaped channels, with the dovetail shaped channel closest to said first plane being designated as a seal channel and the dovetail shaped channel closest to said second plane being designated as a structural channel, a plurality of said building panels being arrayed parallel to one another and forming a sheathing assembly for a structure having a demand side management (DSM) system for the control of energy usage, said structure having a frame made up of girders and columns, said girders and columns having attachment flanges for securing said sheathing assembly, said attachment flanges each having a periodic series of holes, said sheathing assembly including a multiplicity of structural connector means, each of said structural connector means having a first and a second configuration, said structural connector means being capable of placement between and aligning adjacent building panels in said first configuration and said structural connector means engaging said structural channels of said adjacent building panels and said holes in said second configuration, and securing said building panels to said attachment flanges in the areas where said building panels traverse said girders and columns, said sheathing assembly further including flexible connector means for weather sealing and mechanically connecting said seal channels of said adjacent building panels to one another, said DSM system comprising; insulating means, daylighting means and heat exchange means incorporated within said building panels making up one or more of said sheathing assemblies, said DSM system including; energy exchange loop means for circulating a heat transfer fluid between said heat exchange means and a thermal storage tank containing a thermal storage media and hvac loop means for circulating said thermal storage media between said thermal storage tank and a space heating and cooling system, said DSM system further including; control means for operating said energy exchange loop, said hvac loop, said daylighting means and minimizing outside energy demand for the operation of said structure.

21. The panel of claim 14, a plurality of said photovoltaic panels arranged in an ordered array, attached to a structure and comprising a distributed electrical power system, said power system including; heliostat means for concentrating sunlight on said array, power conditioning means for attaching to said output devices and supplying a standard electrical voltage and frequency to a site power distribution panel, said power system further including; excess heat collection means for circulating a heat transfer fluid between said photovoltaic panels and a thermal storage tank containing a thermal storage media, thermal conversion means for utilizing the temperature differential between said thermal storage media and a cooler thermal reservoir to generate additional electrical power, power conditioning circuitry connecting said additional electrical power to said site power distribution panel, a grid connection between said site power distribution panel and an outside source of standard electrical power, and finally, connections between said site power distribution panel and a group of local electrical loads;

whereby, said photovoltaic panels and said heliostat means can reduce the cost of solar electrical power relative to the prior art, and whereby said heat collection means and thermal conversion means can supply electrical power during periods of low sunlight or at night.

22. The thermal storage tank of claim 13, further including;

an intermittent renewable source of heat and circulation means for transferring said heat between said renewable source and said thermal storage media, a thermal electric generator (TEG) having a warm fluid channel and a cool fluid channel, said TEG having the capability to provide an electrical output to an electrical load, fluid supply means for producing a flow of said thermal storage media from said thermal storage tank to said warm fluid channel and producing a flow of a cool fluid from a cool fluid reservoir to said cool fluid channel, and electrical control means for conditioning said electrical output of said TEG to a standard power configuration, for connecting said electrical output to said electrical load, and synchronizing said fluid supply means and the operation of said TEG to said electrical load, said thermal storage tank, said renewable source of heat, said circulation means, said thermal storage media, said TEG, said electrical output, said electrical load, said fluid supply means, said cool fluid, said cool fluid reservoir, and said electrical control means comprising a renewable energy power system;

whereby, said renewable energy power system can supply electrical power based on said intermittent renewable source of heat during times when said source of heat is not available.

\* \* \* \* \*